US012644223B2

(12) United States Patent
Ryoo et al.

(10) Patent No.: US 12,644,223 B2
(45) Date of Patent: Jun. 2, 2026

(54) CLOTHES TREATING APPARATUS AND CONTROL METHOD THEREOF

(71) Applicant: LG Electronics Inc., Seoul (KR)

(72) Inventors: Byeongjo Ryoo, Seoul (KR); Taewon Cheon, Seoul (KR); Haewoong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 763 days.

(21) Appl. No.: 17/910,680

(22) PCT Filed: Feb. 22, 2021

(86) PCT No.: PCT/KR2021/002163
§ 371 (c)(1),
(2) Date: Sep. 9, 2022

(87) PCT Pub. No.: WO2021/182767
PCT Pub. Date: Sep. 16, 2021

(65) Prior Publication Data
US 2023/0175194 A1 Jun. 8, 2023

(30) Foreign Application Priority Data
Mar. 9, 2020 (KR) ........................ 10-2020-0029129

(51) Int. Cl.
*D06F 58/45* (2020.01)
*B08B 3/02* (2006.01)
(Continued)

(52) U.S. Cl.
CPC ................ *D06F 58/45* (2020.02); *B08B 3/02* (2013.01); *D06F 23/02* (2013.01); *D06F 29/005* (2013.01);
(Continued)

(58) Field of Classification Search
CPC ........ D06F 29/005; D06F 34/18; D06F 34/22; D06F 39/087; D06F 39/088; D06F 58/02;
(Continued)

(56) References Cited

U.S. PATENT DOCUMENTS 10,443,184 B2 10/2019 Park et al.
2008/0022465 A1* 1/2008 Jun ........................ D06F 31/00 8/158
(Continued)

FOREIGN PATENT DOCUMENTS

CN 105483970 4/2016
CN 105544164 A 5/2016
(Continued)

OTHER PUBLICATIONS

Extended European Search Report in European Appln. No. 21768505.6, mailed on Mar. 13, 2024, 15 pages.
(Continued)

*Primary Examiner* — Connor J Tremarche
(74) *Attorney, Agent, or Firm* — Fish & Richardson P.C.

(57) ABSTRACT

A clothes treating apparatus is an integrated washing machine in which a washer-dryer combo and a dryer are stacked. The clothes treating apparatus includes a circulation duct that circulates air inside the washing/drying machine or the dryer, and a filter unit that is provided in the circulation duct, where the filter unit is configured to be cleaned using an external water supply source in addition to condensed water.

18 Claims, 9 Drawing Sheets

(51) Int. Cl.

| | |
|---|---|
| ***D06F 23/02*** | (2006.01) |
| ***D06F 29/00*** | (2006.01) |
| ***D06F 34/18*** | (2020.01) |
| ***D06F 34/22*** | (2020.01) |
| ***D06F 39/08*** | (2006.01) |
| ***D06F 58/02*** | (2006.01) |
| ***D06F 58/20*** | (2006.01) |
| ***D06F 58/22*** | (2006.01) |
| ***D06F 58/38*** | (2020.01) |
| *D06F 103/04* | (2020.01) |
| *D06F 103/08* | (2020.01) |
| *D06F 103/18* | (2020.01) |
| *D06F 105/02* | (2020.01) |

(52) U.S. Cl.

CPC .............. *D06F 34/18* (2020.02); *D06F 34/22* (2020.02); *D06F 39/085* (2013.01); *D06F 39/087* (2013.01); *D06F 39/088* (2013.01); *D06F 58/02* (2013.01); *D06F 58/206* (2013.01); *D06F 58/22* (2013.01); *D06F 58/38* (2020.02); *D06F 2103/04* (2020.02); *D06F 2103/08* (2020.02); *D06F 2103/18* (2020.02); *D06F 2105/02* (2020.02)

(58) Field of Classification Search

CPC ........ D06F 58/18; D06F 58/206; D06F 58/22; D06F 58/38; D06F 58/45; D06F 2103/08; D06F 2103/18; D06F 2103/04; D06F 2103/02

USPC ............................................................ 34/318

See application file for complete search history.

(56) References Cited

U.S. PATENT DOCUMENTS

| | | | | |
|---|---|---|---|---|
| 2009/0158784 | A1 | 6/2009 | Kim et al. | |
| 2011/0185511 | A1* | 8/2011 | Ryoo | D06F 39/088 68/19 |
| 2011/0302967 | A1* | 12/2011 | Grunert | D06F 58/45 134/18 |
| 2014/0041249 | A1* | 2/2014 | Jung | F26B 23/001 34/282 |
| 2018/0245271 | A1* | 8/2018 | Bocchino | D06F 58/22 |
| 2019/0024299 | A1* | 1/2019 | Ryu | D06F 58/22 |

FOREIGN PATENT DOCUMENTS

| | | |
|---|---|---|
| CN | 110055710 | 7/2019 |
| EP | 4050152 | 8/2022 |
| JP | 2009213633 | 9/2009 |
| KR | 20100082483 | 7/2010 |
| KR | 10-2012-0110498 A | 10/2012 |
| KR | 20130113690 | 10/2013 |
| KR | 20140023634 | 2/2014 |
| KR | 10-2016-0149593 A | 12/2016 |
| KR | 101718040 | 3/2017 |
| RU | 2456392 | 11/2008 |

OTHER PUBLICATIONS

International Search Report and Written Opinion in International Appln. No. PCT/KR2021/002163, dated Jun. 21, 2021, 17 pages (with English translation).
Office Action in Russian Appln. No. 2022126038, mailed on Mar. 10, 2023, 13 pages.
Office Action in Chinese Appln. No. 202180020129.7, mailed on Mar. 21, 2025, 14 pages (with English translation).

* cited by examiner (a)

(b)

CLOTHES TREATING APPARATUS AND CONTROL METHOD THEREOF

CROSS-REFERENCE TO RELATED APPLICATIONS

This application is a National Stage application under 35 U.S.C. § 371 of International Application No. PCT/KR2021/002163, filed on Feb. 22, 2021, which claims the benefit of Korean Application No. 10-2020-0029129, filed on Mar. 9, 2020. The disclosures of the prior applications are incorporated by reference in their entirety.

TECHNICAL FIELD

The present disclosure relates to a clothes treating apparatus. More specifically, it relates to an integrated clothes treating apparatus in which a washing machine implementing both a washing function and a drying function and a dryer performing a drying function are stacked.

BACKGROUND ART

In general, a clothes treating apparatus is a concept including a washing apparatus configured to wash clothes, a dryer configured to dry wet clothes, a refresher configured to remove odors or wrinkles from clothes, an apparatus capable of washing and drying clothes, and a steamer configured to remove wrinkles using steam.

The washing apparatus includes a cabinet defining an outer appearance, a tube provided in the cabinet to store water, a drum rotatably provided in the tube to store laundry, and a driving unit configured to rotate the drum.

In addition to washing apparatuses, dryers have been developed and are widely used. The dryer may include a drum providing a space to store clothing, a duct defining a flow path to re-supply air discharged from the drum to the drum, a first heat exchanger configured to cool air introduced into the duct from the drum to remove moisture, a second heat exchanger configured to heat air passed through the first heat exchanger, and a fan configured to move the air passed through the second heat exchanger to the drum.

In most cases, a washing apparatus and a dryer are used together at home or a laundry. In particular, a plurality of washing apparatuses and dryers are used together in a laundry. A washing apparatus or a dryer may be used in pairs. In this case, in order to reduce the installation area, the dryer may be stacked on the washing apparatus. An integrated washing apparatus provided with a cabinet in which a dryer is arranged at the top and a washing apparatus is arranged at the bottom is also used.

However, when the washing apparatus and the dryer are simply stacked, the problem of the existing dryer may not be addressed. According to Korean Patent Publication No. 10-2012-0110498, the air discharged from the drum is dehumidified and heated through the heat exchangers and then resupplied to the drum. In this case, foreign substances such as lint may remain in the heat exchangers. In order to address this issue, a conventional clothes treating apparatus includes a filter to filter air supplied to the first heat exchanger or a nozzle to spray water to the filter or the heat exchanger.

The clothes treating apparatus configured to spray water to remove foreign substances from a filter or a heat exchanger generally uses water (condensed water) discharged from air passing through the first heat exchanger during drying of clothing. A method of supplying the filter with condensed water generated during drying of clothing is largely divided into a method of using potential energy and a method of using a pump.

Korean Patent No. 10-1410595 discloses a method of using the drop. In this method, the condensed water generated during drying is moved to a drain tank located at the top of the drum and then the water in the drain tank is drained to the filter or heat exchanger when the filter needs to be washed. In contrast, Korean Patent No. 10-1825449 discloses a method of using a pump.

In this method, condensed water generated during drying is supplied to the filter or heat exchanger using a pump.

The above-described two methods have drawbacks in that washing of the filter or heat exchanger and the degree of washing are determined according to the amount of condensed water generated during drying. In other words, according to the two methods, when the amount of collected condensed water is smaller than the amount thereof required for washing in the operation of determining whether a required amount (reference washing water level) of condensed water for washing of the filter or heat exchanger has been collected, the filter or heat exchanger is washed with only the condensed water generated during drying without supplementing the same. Thus, in the case of conventional clothes treating apparatuses, the filter or heat exchanger may not be sufficiently washed if the amount of condensed water is small.

Further, conventional clothes treating apparatuses may cause inconvenience to the user as the user should empty the stored condensed water.

DISCLOSURE

Technical Problem

An object of the present disclosure devised to solve the above issues is to ensure a sufficient amount of water for cleaning at all times by replenishing heat exchanger cleaning water according to circumstances through direct water introduced into the washing machine when the dryer is arranged at the top and the washing apparatus is arranged on the bottom.

Another object of the present disclosure is to easily implement drainage through a drain hole provided in a dryer to completely remove residual water from the dryer and prevent hygiene and odor related issues caused by growth of microorganisms.

Another object of the present disclosure is to achieve consistent cleaning performance by securing a sufficient amount of cleaning water.

Another object of the present disclosure is to eliminate inconvenience of consumers having to empty stored condensed water.

Technical Solution

The objects of the present disclosure can be achieved by providing a structure and a control method for cleaning a heat exchanger of a dryer on the lower side or a filter positioned in front of the heat exchanger to filter out foreign substances in a product including a washer on the upper side and the dryer integrated with each other, using an external water supply source supplying water to the washer The water supply line of the dryer may be branched from the water supply line in the washer to clean the heat exchanger or the filter arranged before the heat exchanger and may use a pump or a condensed water storage part. In this case, cleaning may be carried out through a pump to draw water from the condensed water storage part and a switching valve. In this case, when the amount of condensed water stored in the condensed water storage part is insufficient, water is replenished using the external water supply source of the washing apparatus.

After cleaning, waste water including contaminants may be discharged through the drainage part of the washer located outside or below by opening the drain hole formed in the condensed water storage part.

To this end, in one embodiment of the present disclosure, provided is a clothes treating apparatus including: a first cabinet defining an outer appearance; a first drum having a cylindrical shape and rotatably arranged in the first cabinet to accommodate clothes; a circulation duct arranged to circulate air from the first drum; a heat exchange part arranged inside the circulation duct, the heat exchange part including a first heat exchanger and a second heat exchanger configured to perform heat exchange with the circulated air; a filter unit arranged inside the circulation duct to separate foreign substances from the circulated air prior to the heat exchange; a second cabinet disposed under the first cabinet; a tub disposed inside the second cabinet to store water; a second drum rotatably disposed inside the tub to accommodate the clothes; a condensed water storage part configured to store condensed water condensed through the heat exchange with the first heat exchanger, or supplied or sprayed water; a water supply part connected to an external water supply source to supply water to the tub or the condensed water storage part; an injector configured to spray water from the condensed water storage part to the first heat exchanger or the filter unit; and a drainage part arranged to discharge water from the tub or the condensed water storage part to an outside.

The first cabinet and the second cabinet may be integrally formed.

The condensed water storage part may be positioned under the circulation duct.

The apparatus may further include a dryness sensor provided in the first drum to measure a dryness of the clothes.

The condensed water storage part may include a water level sensor configured to measure a water level of water stored in the condensed water storage part.

The water supply part may include:

a first water supply pipe connected to an external water supply source; a water supply valve configured to open and close the first water supply pipe; a first switching valve configured to select one of the tub or the condensed water storage part and supply water passed through the water supply valve thereto; and a second water supply pipe connecting the first switching valve and the condensed water storage part.

The injector may include: one or more injection nozzles configured to spray water onto the first heat exchanger or the filter unit; a second switching valve configured to selectively supply water to the one or more injection nozzles; one or more injection ducts connecting the second switching valve and the one or more injection nozzles, a number of the one or more injection being equal to a number of the one or more injection nozzles; and a storage part water supply pipe arranged to supply the water stored in the condensed water storage part to the second switching valve.

The circulation duct may include: an intake duct arranged to suction the air from the first drum; an exhaust duct arranged to discharge the air passed through the heat exchange part; and a connection duct connecting the intake duct and the exhaust duct and having the heat exchange part disposed therein.

The one or more injection nozzles may be fixed to an upper plate defining the connection duct and spray water to different areas of the first heat exchanger or the filter unit.

The one or more injection nozzles may be arranged side by side on the upper plate by side in a lateral direction of the first cabinet, wherein the one or more injection nozzles may be sequentially connected to the storage part water supply pipe by the second switching valve to spray water onto the first heat exchanger or the filter unit.

The drainage part may include: a drain pump configured to discharge the water from the tub to the outside; a first drain pipe connecting the tub and the drain pump; and a second drain pipe arranged to drain the water from the drain pump to the outside.

The drainage part further may include: a third drain pipe connecting the condensed water storage part and the first drain pipe or the drain pump; and a drain valve configured to open and close the third drain pipe.

Provided herein is a clothes treating apparatus including: a first cabinet defining an outer appearance; a first drum having a cylindrical shape and rotatably arranged in the first cabinet to accommodate clothes; a circulation duct arranged to circulate air from the first drum; a heat exchange part arranged inside the circulation duct, the heat exchange part including a first heat exchanger and a second heat exchanger configured to perform heat exchange with the circulated air; a filter unit arranged inside the circulation duct to separate foreign substances from the circulated air prior to the heat exchange; a second cabinet disposed under the first cabinet; a tub disposed inside the second cabinet to store water; a second drum rotatably disposed inside the tub to accommodate the clothes; an injector configured to spray water onto the first heat exchanger or the filter unit; a water supply part connected to an external water supply source to supply water to the tub or the injector; a condensed water storage part configured to store condensed water condensed through heat exchange with the first heat exchanger and water sprayed through the injector; and a drainage part arranged to discharge water from the tub or the condensed water storage part to an outside.

In this case, the water supply part is configured to supply water by dividing the water into the tub or the injector, and may include a branch pipe configured to branch the external water supply source to the tub or the injector; and an injector water supply pipe connecting the branch pipe and the injector.

The injector may include: one or more injection nozzles configured to spray water onto the first heat exchanger or the filter unit; and a switching valve configured to selectively supply water to the one or more injection nozzles, wherein the injector water supply pipe may be connected to the switching valve.

The filter unit may include a first filtering part arranged in the connection duct, wherein the first filtering part may include a first filter configured to filter a fluid moving to the first heat exchanger, and a second filtering part fixed to the first filtering part to filter the fluid moving to the condensed water storage part.

The injector may spray water toward the first heat exchanger or the first filter.

Provided herein is a method for controlling a clothes treating apparatus including a first cabinet defining an outer appearance; a first drum having a cylindrical shape and rotatably arranged in the first cabinet to accommodate clothes; a circulation duct arranged to circulate air from the first drum; a heat exchange part arranged inside the circulation duct, the heat exchange part including a first heat exchanger and a second heat exchanger configured to perform heat exchange with the circulated air; a filter unit arranged inside the circulation duct to separate foreign substances from the circulated air prior to the heat exchange; a second cabinet disposed under the first cabinet; a tub disposed inside the second cabinet to store water; a second drum rotatably disposed inside the tub to accommodate the clothes; a condensed water storage part configured to store condensed water condensed through the heat exchange with the first heat exchanger, or supplied or sprayed water; a water supply part connected to an external water supply source to supply water to the tub or the condensed water storage part; an injector configured to spray water from the condensed water storage part to the first heat exchanger or the filter unit; a dryness sensor disposed in the first drum to measure a dryness of the clothes; and a water level sensor configured to measure a water level in the condensed water storage part.

The method may include: starting a drying operation by rotating the first drum; comparing the dryness measured by the dryness sensor with a preset reference dryness, and measuring a first water level through the water level sensor when the measured dryness is greater than or equal to the reference dryness; based on the first water level being lower than a preset first reference water level, supplying water to the condensed water storage part by opening the water supply valve until the second water level measured by the water level sensor becomes higher than or equal to the preset first reference water level; and cleaning the first heat exchanger or the filter unit through the injector.

The method may further include, after cleaning the first heat exchanger or the filter through the injector, closing the water supply valve and draining residual water from the condensed water storage part through the drainage part.

The method may further include: predicting an amount of condensed water generated by sensing a laundry amount of the clothes accommodated in the first drum through a laundry amount sensor configured to measure the laundry amount of the clothes, the predicting being performed before starting the drying operation by rotating the first drum; supplying an insufficient amount of water to the condensed water storage part by opening the water supply valve.

Provided herein is a method for controlling a clothes treating apparatus including a first cabinet defining an outer appearance; a first drum having a cylindrical shape and rotatably arranged in the first cabinet to accommodate clothes; a circulation duct arranged to circulate air from the first drum; a heat exchange part arranged inside the circulation duct, the heat exchange part including a first heat exchanger and a second heat exchanger configured to perform heat exchange with the circulated air; a second cabinet disposed under the first cabinet; a tub disposed inside the second cabinet to store water; a second drum rotatably disposed inside the tub to accommodate the clothes; an injector configured to spray water onto the first heat exchanger; a water supply pipe connected to an external water source to supply water; a water supply valve configured to open and close the water supply pipe; a condensed water storage part configured to store condensed water condensed through heat exchange with the first heat exchanger, water supplied through the water supply pipe, or water sprayed onto the first heat exchanger through the injector; a dryness sensor disposed in the first drum to measure a dryness of the clothes; and a water level sensor configured to measure a water level in the condensed water storage part, the method including: starting a drying operation by rotating the first drum; based on the dryness measured by the dryness sensor being greater than or equal to a preset reference dryness, measuring a first water level through the water level sensor; based on the measured dryness being greater than or equal to the preset reference dryness, supplying water to the injector by opening the water supply valve; and cleaning the first heat exchanger or the filter unit through the injector.

Advantageous Effects

According to the present disclosure, a sufficient amount of water for cleaning may be ensured at all times by replenishing heat exchanger cleaning water according to circumstances through direct water introduced into the washing machine when the dryer is arranged at the top and the washing apparatus is arranged on the bottom.

According to the present disclosure, drainage may be easily implemented through a drain hole provided in a dryer, thereby completely removing residual water from the dryer and preventing hygiene and odor related issues caused by growth of microorganisms.

According to the present disclosure, consistent cleaning performance may be achieved by securing a sufficient amount of cleaning water.

According to the present disclosure, inconvenience of consumers having to empty stored condensed water may be eliminated.

DESCRIPTION OF DRAWINGS

FIG. 3-(*a*) illustrates an example of direct injection through an external water supply source connected to a switching valve. It also illustrates that drainage is configured for a dryer on the upper side and a washer on the lower side separately. FIG. 3-(*b*) illustrates an example of direct injection through an external water supply source connected to a switching valve as illustrated in FIG. 3-(*a*). In contrast with the case of FIG. 3-(*a*), drainage is operated through a drainage part of the washer on the lower side. FIG. 3-(*c*) illustrates an example in which water from an external water supply source is supplied to a condensed water storage part through a water supply valve and a first switching valve, and water in the condensed water storage part is sprayed again onto a heat exchanger through a first pump and a second switching valve to clean the heat exchanger. In this example, for drainage, water is drained through a drainage valve using the drainage part of the washer on the lower side.

FIG. 4-(*b*) illustrates an example in which a plurality of injection nozzles is connected to a condensed water storage part and thus indirectly connected to an external water supply source.

BEST MODE

Hereinafter, preferred embodiments of a clothes treating apparatus and a control method thereof will be described in detail with reference to the accompanying drawings. A configuration or a control method of an apparatus to be described below is intended to describe an example of a clothes treating apparatus and a control method thereof, and is not intended to limit the scope of the present invention. Wherever possible, the same reference numbers will be used throughout the specification to refer to the same or like parts.

Figure 1:
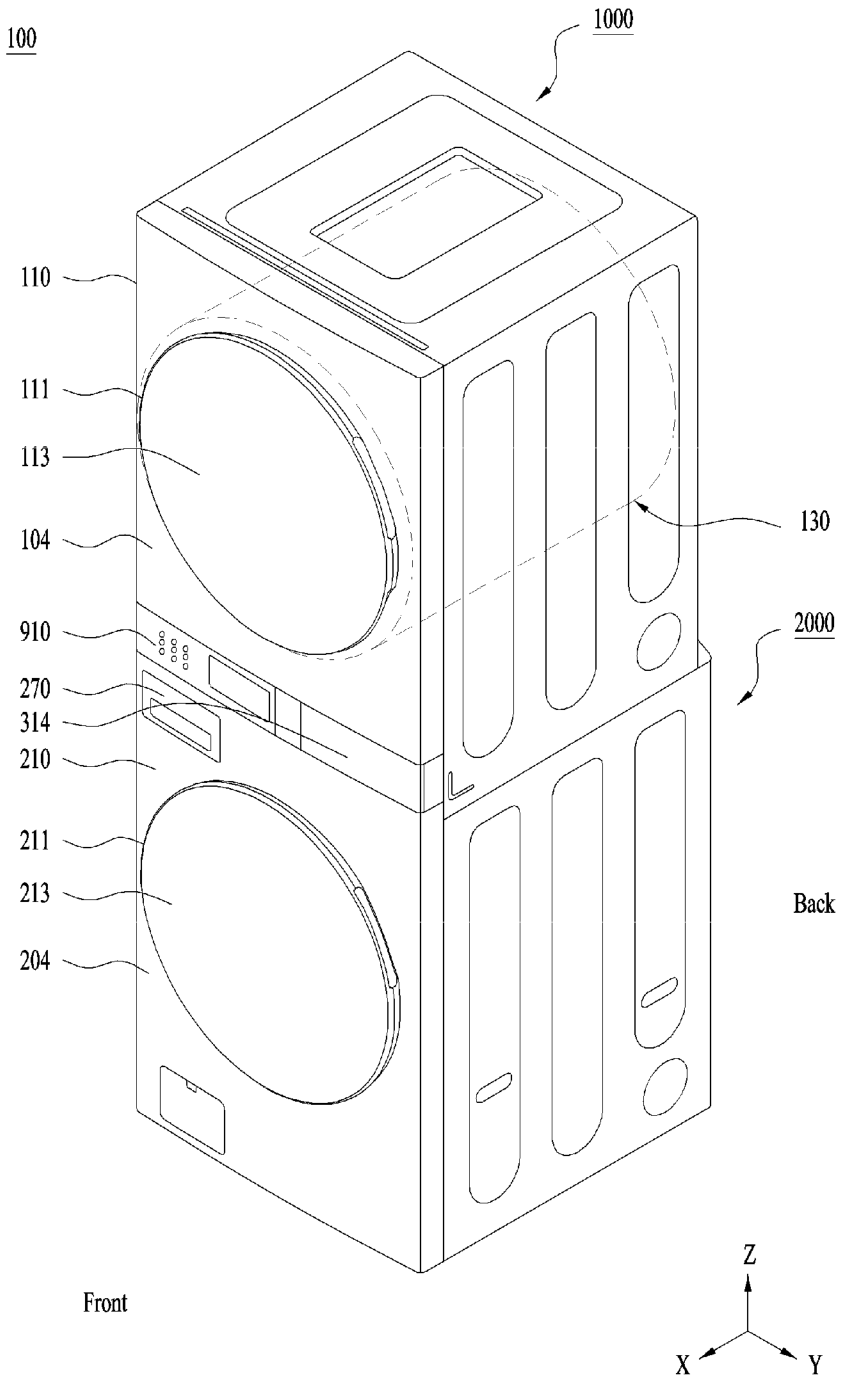
FIG. 1 shows an exemplary clothes treating apparatus of an integrated washing machine type.

FIG. 1 shows an example of an integrally configured clothes treating apparatus 100. The figure illustrates that a first clothes treating apparatus 1000 is positioned on an upper side and a second clothes treating apparatus 2000 is positioned under the first clothes treating apparatus 1000. In general, in consideration of weight, a dryer having a drying function may be provided as the first clothes treating apparatus 1000, and a washer having a washing function may be provided as the second clothes treating apparatus 2000. While it is illustrated that the first clothes treating apparatus 1000 and the second clothes treating apparatus 2000 have the same width and depth, the width, depth, and height of the second clothes treating apparatus 2000 may less than those of the first clothes treating apparatus 1000.

Unlike the example shown in FIG. 1, the first cabinet 110 and the second cabinet 210 may be integrally formed. That is, a first lower panel 106 of the first cabinet 110 and a second upper panel 208 of the second cabinet may not be arranged in a stacked manner to face each other. Instead, the first cabinet 210 and the second cabinet 210 may be integrally formed without the first lower panel 106 and the second panel 208, and a partition base (not shown) may be provided between the first drum 130 and the tub 220. In addition, the partition base (not shown) disposed under the first drum 130 may support various components. That is, it serves as the first lower panel 106 and functions as a base 180 (see FIG. 4) that supports various components coupled thereto.

FIG. 1 also illustrates that a control panel 910 is disposed between a first door 113 and a second door 213. Alternatively, the control panel 910 may be provided to a front panel 104, 204 of the first cabinet 110 or the second cabinet 210. In addition, a filter unit 300 may be provided in a portion of the control panel 910. A through-hole (not shown) through which a filter may be inserted when the control panel 910 is rotated to reveal a back surface thereof for aesthetics may be provided. Alternatively, the first front panel 104 or the second front panel 204 may have a filter door 314, and a filter insertion hole 313 (see FIG. 2) into which a filter (not shown) may be inserted when the filter door 314 is opened may be provided.

Figure 2:
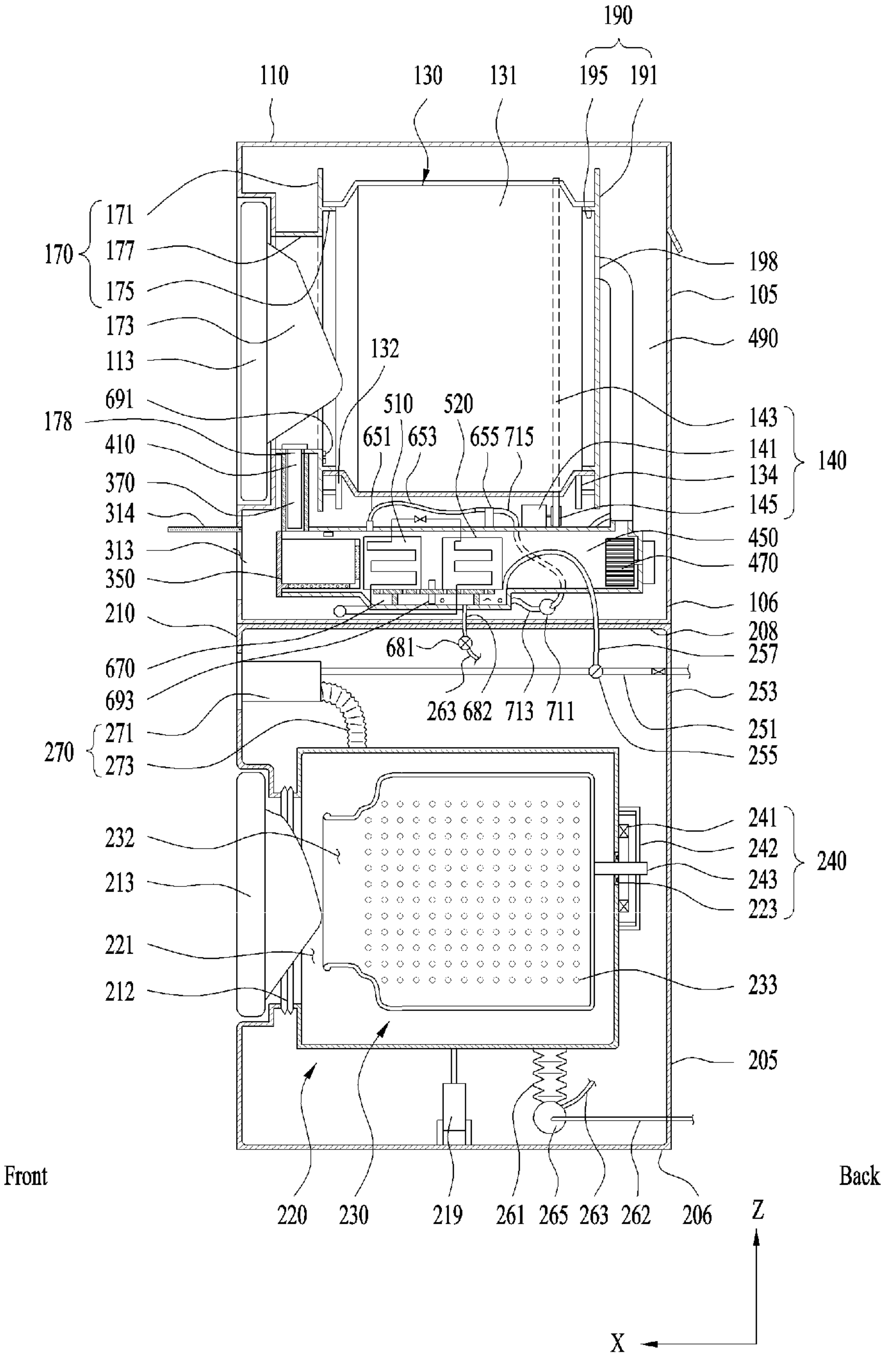
FIG. 2 shows a cross section of the clothes treating apparatus.

FIG. 2 shows a cross section of the integrally configured clothes treating apparatus 100. FIG. 2 illustrates an embodiment of the present disclosure, in which a first clothes treating apparatus 1000 may be positioned on an upper side and a second clothes treating apparatus 2000 may be positioned on a lower side. The first clothes treating apparatus 1000 may be a dryer, and the second clothes treating apparatus 2000 may be a washer. This arrangement is configured merely considering the weight. Unlike this embodiment, the upper and lower parts may be reversed.

The second clothes treating apparatus 2000 positioned on the lower side will be described first. The second clothes treating apparatus 2000 includes a second cabinet 210 defining an outer appearance, a tub 220 provided inside the second cabinet 210 and configured to store washing water, a second drum 230 rotatably provided inside the tub to store clothes, and a second driving unit 240 configured to apply a torque to the second drum 230 to rotate the second drum 230.

The second cabinet 210 is provided with a second inlet 211 for introduction and retrieval of laundry. The second inlet 211 is opened and closed by the second door 213 rotatably provided to the second cabinet 210.

The tub 220 includes a tub inlet 221 communicating with a second inlet 211 and is fixed inside the second cabinet 210 by a tub support 219. The tub support 219 may be provided with a spring or a damper capable of absorbing vibration of the tub 220.

A gasket 212 is provided between the tube inlet 221 and the second inlet 211. The gasket 212 is a member configured to prevent washing water in the tube 220 from being discharged to the outside and preventing vibration of the tube 220 from being transferred to the second cabinet 210.

The tub 220 receives water through a water supply part 250. The water supply part may include a first water supply pipe 251 connected between a water supply source (not shown) and the tub 220 and a water supply valve 253 configured to open and close the first water supply pipe 251.

A detergent storage part 270 configured to store detergent may be further provided above the tub 220. The detergent storage part 270 may include a detergent storage body 271 configured to store detergent and a tub supply pipe 273 allowing the detergent storage body 271 to communicate with the tub.

In this case, the first water supply pipe 251 may be arranged to connect the water supply source (not shown) to the detergent storage body 271. Accordingly, when water is supplied through the first water supply pipe 251, the detergent stored in the detergent storage body 271 may be supplied to the tub 220.

In addition, the water supply part 250 may allow water passing through a water supply valve 253 to be supplied to the detergent storage part 270 along the first water supply pipe 251 and may allow water to be supplied to a condensed water storage part 670 disposed below the first clothes treating apparatus 1000 along a second water supply pipe 257. This configuration is intended to clean the filter unit 300 by directly storing water supplied for the second clothes treating apparatus 2000 in the condensed water storage part 670 and spraying the water to the filter unit 300.

Alternatively, a Y-shaped branch pipe 252 may be connected to the external water supply source. In this case, the branch pipe 252 may be connected to the first water supply pipe 251 and a third water supply pipe 256 (see FIG. 3-(*a*)) to supply water from the external water supply source to the tub 220 or may be supplied to an injector 650, which will be described later, connected to the third water supply pipe 256.

Unlike the second water supply pipe 257, the third water supply pipe 256 may be connected directly to a second switching valve 655 of the injector 650 without intervention of the condensed water storage part 670 in the connection Water stored in the tub 220 is discharged to the outside of the second cabinet 210 through a drainage part 260. The drainage part 260 may include a third drain pipe 263 arranged to guide water inside the tub 220 to the outside of the second cabinet 210, and a drain pump 265 connected to the third drain pipe 263. It may also include a first drain pipe 261 connected to the drain pump 265 for water inside the tub 220, and a second drain pipe 262 arranged to guide the drained water from the condensed water storage part 670 of the first clothes treating apparatus 1000 to the drain pump 265.

The second drum 230 provided inside the tub 220 includes a second drum introduction port 231 communicating with the tub inlet 221. Accordingly, the user may put or withdraw clothes (or referred to as laundry) into or from the second drum 230 through the second inlet 211, the tub inlet 221, and the second drum introduction port 231.

A plurality of second drum through-holes 233 allowing the inside of the second drum 230 to communicate with the tub 220 therethrough may be further provided in an outer circumferential surface of the second drum 230. Accordingly, the water stored in the tub 220 may be supplied to the laundry stored in the second drum 230 through the second drum through-holes 233, and the water contained in the laundry may be discharged to the tub 220 through the second drum through-holes 233.

The second drum 230 may be rotated by a second driving part 240 arranged outside the tub 220. The second driving part 240 may include a second motor 246, namely, a stator 242 fixed to a rear surface of the tub 220, a rotor 241 configured to rotate by electromagnetic interaction with the stator 242, and a rotation shaft 243 arranged to connect the rotor 241 to a rear surface of the second drum 230. As described above, the second drum 230 is different from the first drum 130 in that the rotation shaft 243 of the second motor 246 is directly connectable to the rear surface of the drum.

When electric power is supplied to the stator 242 from a power supply, the stator forms a rotating field, and the rotor 241 is rotated by the rotating field provided by the stator 242. Since the rotation of the rotor 241 is transmitted to the second drum 230 via the rotation shaft 243, a torque required for rotation of the second drum 230 may be provided by supplying electric power to the stator 242.

The rotation shaft 243 may be connected to the second drum 230 and the rotor 241 through the rear surface of the tub 220. In this case, a bearing 223 to rotatably support the rotation shaft 243 may be further provided in the rear surface of the tub 220.

The first clothes treating apparatus 1000 arranged on the upper side includes a first cabinet 110, a first drum 130 rotatably provided inside the first cabinet to provide a space to store clothing, a circulation duct 400 arranged to circulate air of the first drum 130, and a heat exchange part 500 provided inside the circulation duct 400 to dehumidify and heat the air introduced into the circulation duct 400 and then re-supply the same to the first drum 130.

The first cabinet 110 may include a first front panel 104 defining a front face of the first clothes treating apparatus 1000, a first rear panel 105 defining a rear face of the first clothes treating apparatus, and a first upper panel 108 defining a top face of the first clothes treating apparatus.

The first front panel 104 may include a first introduction port 111 arranged to communicate with the first drum 130. The first introduction port 111 may be opened and closed by the first door 113 rotatably coupled to the first cabinet 110.

A separate control panel (not shown) may be provided to the first front panel 104. Alternatively, a control panel 910 to integrally control the first clothes treating apparatus 1000 and the second clothes treating apparatus 2000 may be positioned on the panels 104 and 204 of the first cabinet 110 and the second cabinet 210 between the first drum 130 and the tub 220. This configuration may be provided in consideration of user convenience in terms of access.

The control panel 910 may include an input unit (not shown) and a display (not shown). The input unit may include a power supply requester configured to make a request for supply of power to the clothes treating apparatus 100, a course input unit allowing a user to select a desired course among a plurality of courses, and an execution requester configured to request the start of a course selected by the user. The display may include at least one of a display panel capable of outputting text and a figure, and a speaker capable of outputting a voice signal and sound.

When the first drum 130 is provided as a cylindrical first drum body 131 having front and openings, a first support 170 to rotatably support the front of the first drum 130 and a second support 190 to rotatably support the rear of the first drum 130 may be provided in the first cabinet 110.

The first support 170 may include a first fixed body 171 fixed in the first cabinet 110, a first drum introduction port 173 formed through the first fixed body to allow the first introduction port 111 to communicate with the first drum body 131, and a first support body 175 provided to the first fixed body 171 and inserted into the front (first opening) of the first drum body 131.

The first fixed body 171 may have any shape that allows the first drum introduction port 173 and the first support body 175 to be provided. The first support body 175 may have a pipe shape protruding from the first fixed body 171 toward the first drum body 131, and a diameter of the first support body 175 may be set to be larger than a diameter of the first drum introduction port 173 and smaller than a diameter of a front face of the first drum body 131. In this case, the first drum introduction port 173 may be positioned inside a space defined by the first support body 175.

The first support 170 may further include a connection body 177 connecting the first introduction port 111 and the first drum introduction port 173. The connection body 177 may be formed in a pipe shape extending from the first drum introduction port 173 toward the first introduction port 111. The connection body 177 may be provided with an air outlet 178 communicating with the circulation duct 400. The circulation duct 400 includes an intake duct 410 configured to suction air from the first drum 130, an exhaust duct 490 configured to discharge air passed through the intake duct 410 back to the first drum 130, and a connection duct 450 connecting the intake duct 410 and the exhaust duct 490 and containing a heat exchange part 500.

As shown in FIG. 2, the air outlet 178 is a path through which air may move from the first drum body 131 to the intake duct 410, and may be provided as a through-hole formed through the connection body 177.

As illustrated in FIG. 2, the second support 190 may include a second fixed body 191 fixed inside the first cabinet 110, and a second support body 195 provided to the second fixed body 191 and inserted into the rear (second opening) of the first drum body 131. The second support 190 includes an air inlet 198 formed through the second fixed body 191 to allow the inside of the first drum body 131 to communicate with the inside of the first cabinet 110. In this case, the circulation duct 400 may be arranged to connect the air outlet 178 and the air inlet 198.

The cylindrical first drum body 131 having a hollow cylindrical shape may be rotated by first driving parts of various types. FIG. 2 illustrates a case where the first driving part 140 includes a first motor 141 fixed inside the first cabinet 110, a pulley 145 rotated by the first motor 141, and a belt 143 connecting the circumferential surface of the pulley 145 and the circumferential surface of the first drum body 131.

In this case, the first support 170 may be provided with a first roller 132 configured to rotatably support the circumferential surface of the first drum body 131, and the second support 190 may be provided with a second roller 134 configured to rotatably support the circumferential surface of the first drum body 131.

The circulation duct 400 may include an intake duct 410 connected to the air outlet 178; an exhaust duct 490 connected to the air inlet 198; and a connection duct 450 connecting the intake duct 410 and the exhaust duct 490.

The heat exchange part 500 may be implemented by various apparatuses capable of sequentially dehumidifying and heating air introduced into the circulation duct 400. FIG. 2 illustrates a case where the heat exchange part 500 is configured as a heat pump.

The heat exchange part 500 shown in FIG. 2 includes a fan 470 configured to move air along the connection duct 450, a first heat exchanger (heat absorption part) 510 configured to remove moisture from the air introduced into the connection duct 450, and a second heat exchanger (hearting part) 530 arranged inside the connection duct 450 to heat the air passed through the first heat exchanger 510.

The fan 470 may include an impeller 471 arranged in the circulation duct 400 and a blower motor 473 configured to rotate the impeller 471. The impeller 471 may be arranged in any of the exhaust duct 490, the connection duct 450, and the intake duct 410. FIG. 2 illustrates a case where the impeller 471 is provided to the exhaust duct 490 and positioned behind the second heat exchanger 520.

In another embodiment, the fan 470 may be positioned in front of the heat exchange part 500, that is, in front of the first heat exchanger.

The first heat exchanger 510 may include a plurality of metal plates disposed in a width direction (Y-axis direction) of the connection duct 450 or a height direction (Z-axis direction) of the connection duct, and the second heat exchanger 520 may include a plurality of metal plates disposed in the width direction of the connection duct or the height direction of the connection duct. The first heat exchanger 510 and the second heat exchanger 520 are sequentially disposed in the connection duct 450 in a direction from the intake duct 410 toward the exhaust duct 490 and are connected to each other by a refrigerant pipe 580, which defines a circulation flow path of a refrigerant.

The refrigerant is moved along the refrigerant pipe 580 by a compressor 570 disposed outside the circulation duct 400. The refrigerant pipe 580 includes an expansion part 550 configured to adjust the pressure of the refrigerant passing through the second heat exchanger 520.

The second heat exchanger 520 is configured to cool air and evaporate the refrigerant by transferring heat from the air introduced into the intake duct 410 to the refrigerant. The second heat exchanger 520 is configured to heat air and condense the refrigerant by transferring heat from the refrigerant passed through the compressor 570 to the air. In this case, moisture contained in the air may be collected on the bottom surface of the connection duct 450 along the surface of the first heat exchanger 510 when passing through the first heat exchanger 510.

In order to collect condensed water from the air passing through the first heat exchanger 510, a condensed water storage part 670 is provided in the clothes treating apparatus 100. FIG. 2 illustrates a case where the condensed water storage part 670 is arranged in the connection duct 450 and positioned under the first heat exchanger 510 and the second heat exchanger 520. This configuration is intended to move the condensed water by gravity without the help of a mechanism or a mechanical apparatus that forces the movement of the condensed water.

Figure 4:
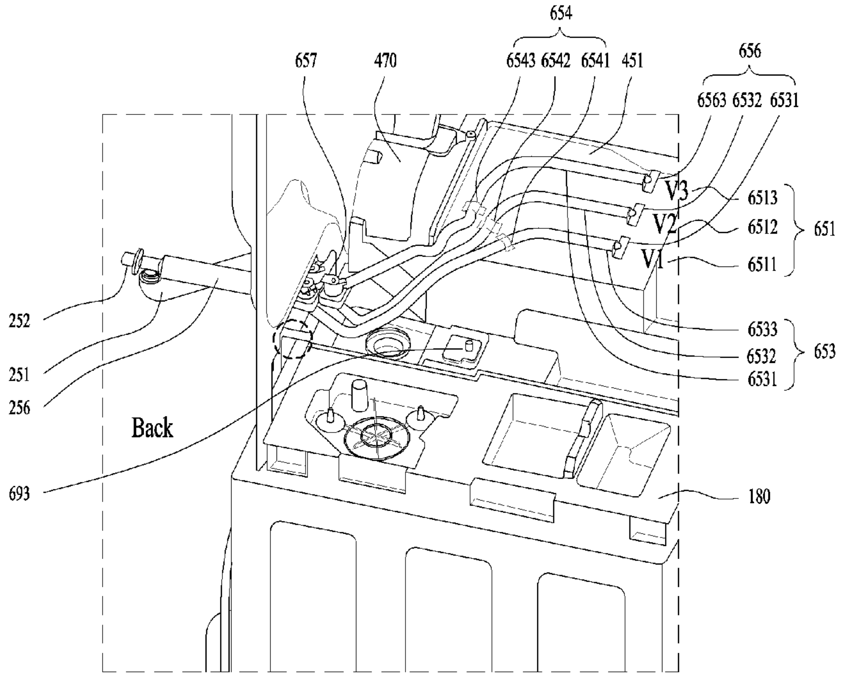
FIG. 4-(*a*) illustrates an example in which a plurality of injection nozzles is directly connected to an external water supply source.
Figure 4:
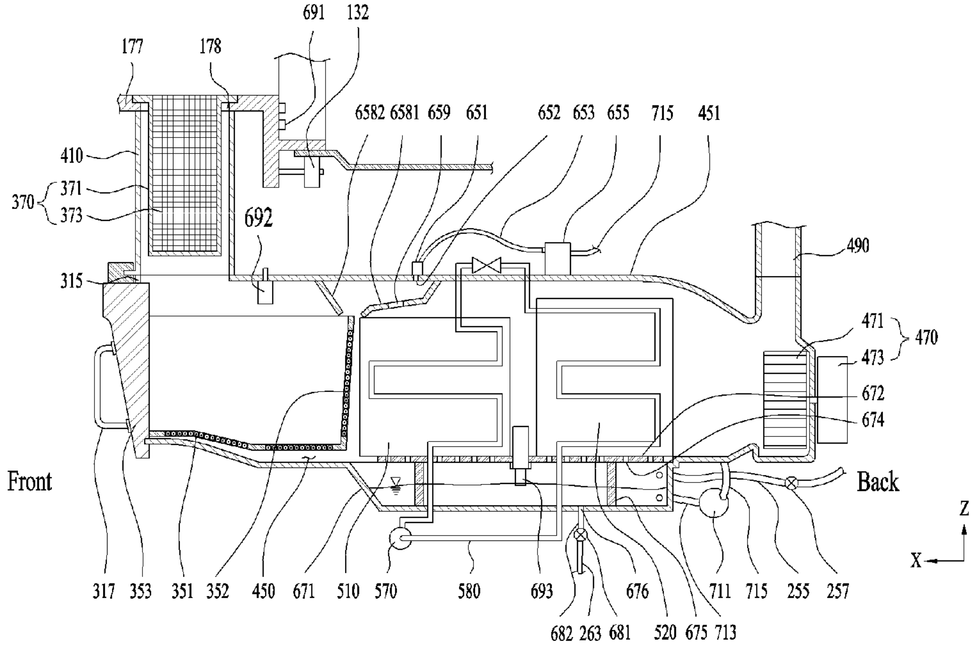

Referring to FIG. 4-(*b*), the condensed water storage part 670 may include a water collection body 671 fixed to a bottom surface of the connection duct 450 and communicating with the inside of the connection duct. A heat exchanger support may be further provided in the water collection body 671 such that the first heat exchanger 510 and the second heat exchanger 520 do not contact water (condensed water) stored in the water collection body 671. The heat exchanger support may include a support plate 672 arranged to contact the first heat exchanger 510 and the second heat exchanger 520, a spacer 675 provided to maintain a gap between the support plate 672 and a bottom surface of the water collection body 671, and a support plate through-hole 674 formed through the support plate 672.

The support plate through-hole 674 may be provided only in a space in which the first heat exchanger 510 is supported in the spaces provided by the support plate 672, or may be provided in the space in which the first heat exchanger is supported and a space in which the second heat exchanger is supported, respectively. When the support plate through-hole 674 is provided even below the second heat exchanger 520, water moved to the second heat exchanger 520 along the support plate 672 may be discharged to the water collection body 671. This configuration is intended to prevent a decrease in efficiency of heat transfer occurring when the second heat exchanger 520 comes into contact with water, as in the case of the first heat exchanger 510.

In order to minimize the stacking of foreign substances (lints, etc.) discharged from the first drum body 131 on the first heat exchanger 510 and the second heat exchanger 520, the first clothes treating apparatus 1000 may further include a filter unit 300 configured to filter air. FIG. 4-(*b*) illustrates a case where the filter unit 300 includes a first filtering part 350 provided in the connection duct 450 and a second filtering part 370 provided in the intake duct 410.

The second filtering part 370 may be configured to filter air flowing into the intake duct 410 from the first drum body 131, and the first filtering part 350 may be arranged between the second filtering part 370 and the first heat exchanger 510 to filter air passed through the second filtering part 370.

The first filtering unit 350 may be detachably provided in the connection duct 450. In this case, the first front panel 104 of the first cabinet may include a filter insertion hole 313 (see FIG. 2) from which the first filtering part 350 is withdrawn and a filter door 314 configured to open and close the filter insertion hole 313. The connection duct 450 may include a duct through-hole 3150 (see FIG. 4-(*b*)) into which the first filtering part 350 is inserted. Accordingly, when necessary, the user may separate the first filtering part 350 from the clothes treating apparatus to remove foreign substances remaining in the first filtering part 350 and wash the first filtering part.

As illustrated in FIG. 4-(*b*), the first filtering part 350 may include a first frame 353 inserted into the duct through-hole 315 and positioned between the second filtering part 370 and the first heat exchanger 510, and filters 351 and 352 provided in the first frame 353 to filter a fluid moving to the first heat exchanger 510 and the water collection body 671.

The first frame 353 may be formed in various shapes according to the shape of the cross section (Y-Z plane and the X-Z plane) of the connection duct 450. FIG. 2 illustrates a case where the first frame 353 is formed in a shape similar to a hexahedron.

In this case, a filter inlet for introducing air passed through the second filtering part 370 into the first frame 353 may be provided in the top surface of the first frame 353, and a handle 317 protruding toward the filter insertion hole 313 may be provided on a front surface of the first frame 353. The filters 351 and 352 may include a first filter 351 provided on a rear surface of the first frame 353 and a second filter 352 provided on a bottom surface of the first frame 353. The rear surface of the first frame may represent a face facing the first heat exchanger 510 in a space defined by the first frame 353, and a bottom surface of the first frame may be set as a face facing the bottom surface of the connection duct 450 and the filter insertion hole.

The second filtering part 370 may include a second frame 371 detachably inserted into the intake duct 410 through the air outlet 178, and a third filter 373 provided in the second frame to filter air. Diameters of the filter holes provided in the first filter 351 and the second filter 352 may be set to be smaller than the diameter of the filter holes provided in the third filter 373. Therefore, after relatively large foreign substances may be first filtered out by the third filter, and then smaller foreign substances may be filtered out by the first filter 351 and the second filter 352.

As illustrated in FIG. 2, the first clothes treating apparatus 100 may further include a injector 650 configured to wash the first filtering part 350 using water stored in the water collection body 671, a drainage part 260 configured to discharge water from the water collection body 671 to the outside of the water collection body 671.

As illustrated in FIG. 2, the injector 650 may be configured to wash at least one of the first filter 351, the second filter 352, and the first heat exchanger 510 by spraying water stored in the water collection body 671 onto the first filtering part 350. The injector 650 may include an injector 650 provided to the connection duct 450 to supply water to the first filtering part 350, and a water supply pump 711 configured to move water stored in the water collection body 671 to the injector 650.

The water supply pump 711 may be connected to the water collection body 671 by a water supply pump connection pipe 713, and may be connected to the injector 650 by a storage part water supply pipe 715.

The injector 650 may include a nozzle fixed to the connection duct 450 to spray water to the first filter 351 and the second filter 352, or as a nozzle for spraying water to each of the front surfaces of the first filter 351, the second filter 352, and the first heat exchanger 510.

The cleaning through the injector 650 is intended to prevent foreign substances from being stuck to the first filter 351, the second filter 352, and the first heat exchanger 510 to degrade filtering performance of the filters and heat exchange performance of the heat exchange part, and cause hygiene problems.

FIG. 4-(*b*) illustrates a case where the injector 650 includes a connection duct through-hole 652 formed through the connection duct 450 to connect an injection duct 653, a first guide 6581 configured to guide water supplied through the connection duct through-hole 652 to the first filter 351, and a second guide 6582 configured to guide at least a portion of the water supplied through the first guide 6581 to the front surface of the first heat exchanger 510. In this case, the second guide 6582 may be provided as a member to supply water to the front surface of the first heat exchanger 510 via the first filter 351. That is, when the first filtering part 350 is fixed to the connection duct 450, the first filter 351 may be disposed between the first guide 6581 and the second guide 6582, and the second guide 6582 may include a slope downwardly inclined toward the first filter 351 from the top surface of the connection duct 450.

A guide through-hole 659 may be further provided in the first guide 6581. The guide through-hole 659 is a hole formed through the first guide 6581, and water introduced into the connection duct through-hole 652 may be supplied to the front area of the first heat exchanger 510 through the guide through-hole 659. The front area of the first heat exchanger means a part positioned on a side facing the first filter 351 with respect to a vertical line passing through the center of the first heat exchanger 510.

The above-described clothes treating apparatus 100 may cleaning the first filtering part 350 and the first heat exchanger 510 with water stored in the water collection body 671 during the operation of the heat exchange part 500. However, when the amount of water stored in the water collection body 671 is small, cleaning of the first filtering part 350 and the first heat exchanger 510 may not be executed. When the amount of clothing put into the first drum body 131 is small, the amount of water collected in the water collection body 671 during the operation of the heat exchange part 500 may be small. When the amount of water stored in the collection body is small, a sufficient amount of water for cleaning of the first filtering part 350 and the first heat exchanger 510 may not be supplied to the injector 650.

To address the above-described issue, the clothes treating apparatus 100 may supply water to the water collection body 671 of the condensed water storage part 670 using an external water supply source required for the second clothes treating apparatus 2000.

Referring to FIG. 2, the water supply part 250 includes a first water supply pipe 251 connected to an external water supply source and a water supply valve 253 configured to open and close the first water supply pipe 251. Although the first water supply pipe 251 and the water supply valve 253 are intended for a washing function of the first clothes treating apparatus 1000, they are used to ensure a sufficient amount of water for cleaning of the first filtering part 350 of the filter unit 300 and cleaning of the first heat exchanger. To this end, water passed through the water supply valve 253 may be supplied to the first clothes treating apparatus 1000 or the second clothes treating apparatus 2000 through the first switching valve 255.

That is, the first switching valve 255 is a valve capable of switching a water supply direction by selecting either the tub 220 or the condensed water storage part 670. The controller may operate the first switching valve 255 to supply water to one of the second clothes treating apparatus 2000 and the first clothes treating apparatus 1000. Alternatively, while water is supplied to the first clothes treating apparatus 1000, the controller may cause water to be supplied to the second clothes treating apparatus 2000 when water is required.

A flow path along which water is supplied to the water collection body 671 of the condensed water storage part 670 through the first switching valve 255 will be described below. The second water supply pipe 257 is arranged between the first switching valve 255 and the water collection body 671 to connect the first switching valve 255 and the water collection body 671. Water passed through the first switching valve 255 is supplied to the water collection body 671 through the second water supply pipe 257.

The supplied water is used to clean the first heat exchanger 510 or the first filtering part 350, specifically, the first filter 351 and the second filter 352, of the filter unit 300 using the injector 650.

The flow path of the injector 650 may include the water supply pump 711 to supply water stored in the water collection body 671. The water supply connection pipe 713 may be connected by the water collection body 671 and the water supply pump 711, and the injector 650 and the water supply pump 711 may be connected by the storage part water supply pipe 715.

The injector 650 may be installed on the connection duct upper plate 451 forming the upper body of the connection duct. The injector 650 may include an injection nozzle 651 configured to spray water to clean the first heat exchanger 510 or the first filtering part 350, and an injection duct 653 connecting the injection nozzle 651 to the storage part water supply pipe 715.

Due to the compact structure of the clothes treating apparatus, the size of the water collection body 671 of the condensed water storage part 670 may not be large. In this case, the capacity of the water supply pump 711 may be limited. To overcome this limitation and uniformly spray water onto the first heat exchanger or the first filtering part 350, a plurality of injection nozzles 651 may be provided. Thus, the same number of injection pipes 653 may be provided. In order to spray water while maintaining sufficient water pressure, water may not be simultaneously supplied through the injection pipes 653, but may be selectively injected into one of the injection pipes 653.

In addition, when it is determined that the contamination level is high in a specific area of the first heat exchange part 500 or the filter unit 300, only the area with the high contamination level may be cleaned by spraying water.

When it is determined that the area of the first heat exchange unit or the filter unit that is cleaned by spraying water through the first spray nozzle is highly contaminated, the controller may use the first spray nozzle to clean only the corresponding part.

When a plurality of injection nozzles 651 is provided, each injection nozzle may be selected and water may be supplied through the corresponding injection duct 653. In addition, spraying may be sequentially performed.

For example, when three spray nozzles are provided, water may be sprayed by supplying water to a first spray nozzle first. Then, when a preset time elapses, water may be sprayed by supplying water to a second spray nozzle. Then, when the preset time elapses again, water may be sprayed by supplying water to a third spray nozzle.

For the above-described sequential spray method, the storage part water supply pipe 715 and the plurality of injection pipes 653 may not be directly connected, but may be connected via the second switching valve 655.

That is, the second switching valve 655 may be operated by the controller to switch the direction of water to supply water to each injection pipe for a predetermined time. For example, a 3-way solenoid valve may be used as the second switching valve.

Accordingly, when water in the water collection body 671 is insufficient, the controller may control the first switching valve 255 and the second water supply pipe to receive water from the condensed water storage part 670. When necessary, the first filtering part 350 and the first heat exchanger 510 may be cleaned by supplying the water stored in the water collection body 671 through the water supply pump 711, the storage part water supply pipe 715, the second switching valve 655, the injection duct 653, and the injection nozzle 651.

Alternatively, water may be directly supplied to the injector 650 through the branch pipe 252 without passing through the water collection body 671. This case will be described later with reference to FIG. 3.

As shown in FIG. 2 or FIG. 4-(*b*), the clothes treating apparatus 100 may include a water level sensor 693 configured to measure a water level in the water collection body 671 and transmit the measured level to the controller. When the water level sensor 693 is provided, the clothes treating apparatus may drain water from the water collection body 671, thereby preventing water from flowing back from the water collection body 671 into the connection duct 450. It may also prevent the water level in the water collection body 671 of the condensed water storage part 670 from rising when the drainage is blocked or the water pressure is strong and thus the amount of supplied water is larger than that of drained water during cleaning of the filter unit and/or the first heat exchanger through the injector 650. Thereby, the issue of backflow may be prevented.

The water level sensor 693 may be implemented by any device capable of sensing the water level in the water collection body 671. FIG. 2 or FIG. 4-(*b*) shows a sensor provided with a plurality of electrodes (electrically connected according to the water level) having different lengths as an example. Alternatively, the water level may be determined by sensing the position of a floater provided on the bottom surface of the water collection body 671 and rising according to the water level.

When the water level measured through the water level sensor 693 is less than a preset reference water level, the controller provided in the clothes treating apparatus may open the water supply valve 253 and switch the first switching valve 255 to supply water to the water collection body 671 through the second water supply pipe 257 and the storage part water pipe 715. The supplied water may be supplied to the injector 650 using the water supply pump 711.

Accordingly, the clothes treating apparatus 100 may minimize the issue of failure to clean the first filtering part 350 or the first heat exchanger 510 due to a lack of water in the water collection body 671. That is, the above-described operation is intended to satisfy the reference water level ensuring the maximum cleaning performance by supplementing water required for cleaning.

The above-described clothes treating apparatus may drain water from the water collection body 671 through the drainage part 260 based on the water level sensor 693 alone, or may control the operation timing and operation duration of the water supply valve 253 configured to open and close the first water supply pipe 251 to control the time at which water is supplied to the condensed water storage part 670 and the amount of water supplied to the condensed water storage part 670.

Water sprayed through the injector 650, water condensed through the heat exchange part 500, and water stored in the condensed water storage part 670 through the water supply part 250 are all stored in the water collection body 671. Accordingly, condensed water alone may exceed the full water level depending on the storage capacity of the water collection body 671 while the drying function of the first clothes treating apparatus 100 is performed. In this case, it is necessary to drain water to prevent backflow of the stored water.

In addition, when the first filtering part and/or the first heat exchanger is cleaned through the injector 650, water from the condensed water storage part 670 is used, and thus the water level must be lowered. However, when the drainage is blocked or the water pressure is high, and thus the water supply rate is greater than the water drainage rate, the water level in the water collection body 671 of the condensed water storage part 670 may not be lowered. Accordingly, the water may be drained by determining the water level through the water level sensor 693.

Referring to FIG. 4-(*b*), the drainage part 260 may include a drain hole 672 provided in the bottom surface of the water collection body 671, a drain valve 681 opened and closed by the control unit to drain water from the water collection body, a drain valve connection pipe 682 connecting the drain valve 681 and the drain hole 672, a first drain pipe 261 arranged to discharge water from the tub 220 to the drain pump 265, a second drain pipe 262 arranged to discharge the water discharged by the drain pump to the outside, and a third drain pipe 263 connecting the drain valve 681 and the drain pump 265.

Here, the drain pump 265 does not simply refer to a pump used to transport water. The drain pump 265 may include a drain pump housing (not shown) communicating with the first drain pipe 261 or the third drain pipe 263 to provide a space for storing water, a drain pump impeller (not shown) rotatably arranged inside the drain pump housing, a drain pump motor (not shown) configured to rotate the drain pump impeller, and a drain pump outlet (not shown) formed through the circumferential surface of the drain pump housing and connected to the second drain pipe 262.

Even when the water level in the water collection body 671 is not high, water remaining in the water collection body 671 of the condensed water storage part 670 needs to be discharged once the operation of cleaning the heat exchanger and the filter unit is finished or the drying cycle is finished. This is intended to prevent issues related to hygiene and odor in the clothes treating apparatus 100. Even in this case, all remaining water may be discharged using the drain hole 672 disposed in the bottom surface of the water collection body 671.

In addition, the clothes treating apparatus disclosed herein may further include a controller (not shown). The controller may be disposed at any position as long as it can control the clothes treating apparatus. Generally, the controller may be installed on the back of the control panel 910 so as not to be seen. However, embodiments are not limited thereto. The controller may control the rotation of the first drum 130 and the second drum 230, determine the dryness through the dryness sensor 691, and clean the first heat exchanger and/or the filter unit using the water supply valve 253, the first switching valve 255, the second switching valve 655, and the water pump 711 of the water supply part 250. In addition, the water level may be measured through the water level sensor 693 of the water collection body 671. Then, when the full water level is reached, the controller may open the drain valve 681 to drain water. Then, the controller may control the drain pump 265 to discharge the water to the outside.

As shown in FIG. 2 or FIG. 4-(*b*), the clothes treating apparatus 100 may include dryness sensors 691 and 692 to determine the dryness of the clothing to determine a time to stop the operation of the heat exchange part 500. The drying degree sensors 691 and 692 may include at least one of an electrode sensor 691 arranged to contact clothing to measure an amount of moisture contained in the clothing, and a humidity sensor 692 configured to measure humidity of air flowing into the circulation duct 400 from the first drum 130.

As shown in FIG. 4-(*b*), the electrode sensor 691 may include two electrodes fixed to the first fixed body 171 and capable of contacting the clothing inside the first drum body 131. As the dryness increases, the amount of moisture contained in the clothing will decrease (the electrical resistance of the clothing will increase). Accordingly, the clothes treating apparatus 100 may determine the dryness of the clothing by observing the electrical resistance measured when the two electrodes are connected by the clothing.

On the other hand, as the dryness of the clothing increases, the amount of moisture contained in the air introduced into the circulation duct 400 will decrease. Accordingly, the clothes treating apparatus 100 may also determine the dryness of the clothing by observing the humidity of the air introduced into the intake duct 410 through the humidity sensor 692.

When the dryness measured through the dryness sensor 691 after the drying cycle s started by starting the rotation of the first drum 130 is greater than or equal to a preset reference dryness, the controller may determine the amount of water stored in the condensed water storage part 670 through the water level sensor 693. When the stored water is insufficient, the controller may control the water supply part 250 to supply water to the condensed water storage part 670. When the water is not insufficient, the injector may spray water immediately, but the amount of water stored in the water collection body may be smaller than the water amount for cleaning. Thus, water may need to be replenished during spraying. In this case, the amount of water currently stored in the condensed water storage part 670 may be determined through the water level sensor 693. When it is determined that the stored water is insufficient, the water supply part 250 may be controlled to supply water to the condensed water storage part 670.

Although not shown in the drawings, the clothes treating apparatus 100 may further include a laundry amount sensor configured to determine an amount of clothing stored in the first drum body 131. The laundry amount sensor may be provided as a means to transmit the amount of electric current supplied to the first motor 141 of the driving unit to rotate the first drum body 131 at a predetermined rotation speed, or as a means to transmit, to the controller, the rotation speed of the first drum body 131 obtained when current having a predetermined magnitude is supplied for a predetermined time.

When the laundry amount sensor is provided, the controller may predict the amount of condensed water generated from the clothing accommodated in the first drum by sensing the laundry amount. When it is determined that the amount of generated condensed water is smaller than the amount required for cleaning of the first filtering part 350 or the first heat exchanger 510, water may be replenished through an external water supply source before cleaning the first filtering part 350 or the first heat exchanger 510.

When it is determined that the amount of water stored in the water collection body 671 is larger than the amount required for cleaning of the first filtering part 350 or the first heat exchanger 510, that is, when the amount of water stored in the water collection body 671 is determined to exceed a preset reference level through the water level sensor 693, the controller may open the drain valve 681 to drain the water.

Figure 3:
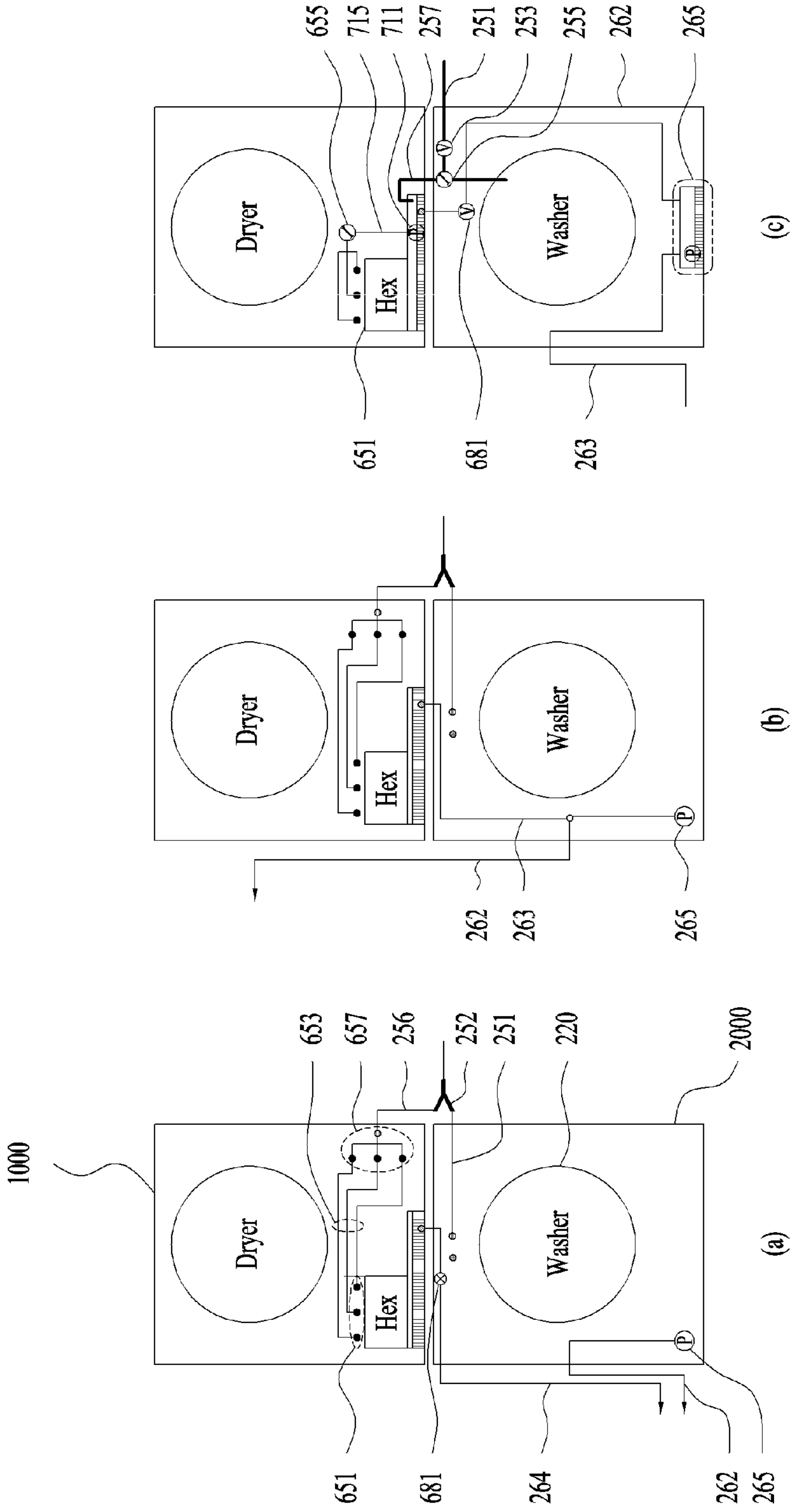
FIG. 3 are conceptual diagrams of water supply and drainage in the clothes treating apparatus.

FIG. 3 are conceptual diagrams of water supply and drainage in the clothes treating apparatus 100. The figure schematically shows how water supply and drainage are performed.

FIG. 3-(*a*) illustrates an embodiment in which an external water supply source is distributed to the first clothes treating apparatus 1000 and the second clothes treating apparatus 2000 using the branch pipe 252. That is, unlike in the case described above, water may be supplied to the injector 650 through the switching valve 657 directly connected thereto without using any of the first switching valve 255 or the second switching valve 655. That is, the water supply may be directly connected and used without using the condensed water storage part 670.

Water passed through the branch pipe 252 is supplied to the first clothes treating apparatus 100 or the second clothes treating apparatus 100 through the first water supply pipe 241 or the third water supply pipe 256. Here, the third water supply pipe 256 is directly connected to the injector 650, while the second water supply pipe 257 described above is connected to the condensed water storage part 670.

Similarly, the injector 650 includes an injection nozzle 651, an injection duct 653, and a switching valve 657. Similarly, a three-way switching valve using a solenoid may be used as the switching valve 657. When such as switching valve is used, the injection nozzle may include one or more injection nozzles, and the injection pipe may include injection pipes as many as the injection nozzles and be connected to the switching valve 657. The switching valve is functionally the same as the second switching valve 655 in that it is a three-way switching valve. However, unlike the second switching valve 655, the switching valve is directly connected to the branch pipe 252 from the external water supply source.

The drainage part 260 may include a drain hole 672 formed in the bottom surface of the water collection body 671 of the condensed water storage part 670, a drain valve 681, a drain valve connection pipe 682 connecting the drain hole 672 and the drain valve 681, and a fourth drain pipe 264 arranged to discharge water from the drain valve 681 directly to the outside. The first clothes treating apparatus 100 may drain the water stored in the tub 220 using the drain pump 265.

FIG. 3-(*b*) illustrates another embodiment of water supply and drainage. As in the case of FIG. 3-(*a*), water may be supplied to the injector 650 through the switching valve 657 connected thereto. That is, the water supply may be directly connected without using the condensed water storage part 670. However, unlike the drainage part in the embodiment of FIG. 3-(*a*), drainage is not individually performed in the first clothes treating apparatus 100 and the second clothes treating apparatus 100, but is collectively performed through the second drain pipe 262. While FIG. 3-(*b*) illustrates that water passed through the drain valve 681 and the third drain pipe 263 is directly connected to the second drain pipe 262, the water may be discharged via the drain pump 265.

FIG. 3-(*c*) illustrates another embodiment. Unlike FIG. 3-(*a*) or FIG. 3-(*b*), the embodiment includes a first water supply pipe 251 connected to an external water supply source and a water supply valve 253 configured to open and close the first water supply pipe 251. Although the first water supply pipe 251 and the water supply valve 253 are intended for a washing function of the first clothes treating apparatus 1000, they are used to ensure a sufficient amount of water for cleaning of the first filtering part 350 of the filter unit 300 and cleaning of the first heat exchanger. To this end, water passed through the water supply valve 253 may be supplied to the first clothes treating apparatus 1000 or the second clothes treating apparatus 2000 through the first switching valve 255.

That is, the first switching valve 255 is a valve capable of switching a water supply direction by selecting either the tub 220 or the condensed water storage part 670. The controller may operate the first switching valve 255 to supply water to one of the second clothes treating apparatus 2000 and the first clothes treating apparatus 1000. Alternatively, while water is supplied to the first clothes treating apparatus 1000, the controller may cause water to be supplied to the second clothes treating apparatus 2000 when water is required.

A flow path along which water is supplied to the water collection body 671 of the condensed water storage part 670 through the first switching valve 255 will be described below. The second water supply pipe 257 is arranged between the first switching valve 255 and the water collection body 671 to connect the first switching valve 255 and the water collection body 671. Water passed through the first switching valve 255 is supplied to the water collection body 671 through the second water supply pipe 257.

The drainage part 260 shown in FIG. 3-(*c*) may include a drain hole 672 provided in the bottom surface of the water collection body 671, a drain valve 681 opened and closed by the control unit to drain water from the water collection body, a drain valve connection pipe 682 connecting the drain valve 681 and the drain hole 672, a first drain pipe 261 arranged to discharge water from the tub 220 to the drain pump 265, a second drain pipe 262 arranged to discharge the water discharged by the drain pump to the outside, and a third drain pipe 263 connecting the drain valve 681 and the drain pump 265.

Here, the drain pump 265 does not simply refer to a pump used to transport water. The drain pump 265 may include a drain pump housing (not shown) communicating with the first drain pipe 251 or the third drain pipe 253 to provide a space for storing water, a drain pump impeller (not shown) rotatably arranged inside the drain pump housing, a drain pump motor (not shown) configured to rotate the drain pump impeller, and a drain pump outlet (not shown) formed through the circumferential surface of the drain pump housing and connected to the second drain pipe 252. FIG. 3-(*c*) shows that another water collection part is arranged under the second clothes treating apparatus 100 positioned on the lower side, but this merely means that the drain pump 265 has a space for storing water, and may thus directly communicate with the third drain pipe 253. Accordingly, a water collection unit other than the drain pump 265 may or may not be provided.

FIG. 4-(*a*) illustrates an example in which a plurality of injection nozzles is directly connected to an external water supply source. As described with reference to FIG. 3-(*a*) or FIG. 3-(*b*), the figure illustrates that an external water supply source is directly connected to the injection duct 653 and the injection nozzle 651 through a switching valve 657. Here, three injection pipes 6531, 6533, and 6535 may be connected to three injection nozzles 6511, 6512, and 6113, respectively, and the switching valve 657 may connect each of the injection pipes to the third water supply pipe 256 at predetermined time intervals.

This is intended to provide the same effect by maintaining a constant injection pressure in any environment because the water pressure of water may vary according to an environment in which the clothes treating apparatus 100 is used. In other words, the switching valve 657 is used to selectively connect one of the injection pipes such that only one injection pipe is connected at a time rather than distributing the water pressure by connecting the three injection pipes at the same time.

The three injection pipes 6531, 6533, and 6535 may be fixed to the upper plate 451 of the connection duct by first fixing parts 6541, 6543, and 6545 and second fixing parts 6561, 6563, and 6565 so as not to be rocked by water pressure. The first fixing part 654 may be connected to the switching valve 657 to fix the injection duct 653 extending over the upper plate, and the second fixing part 656 may fix the injection duct 653 at a position where the injection nozzle 651 is located.

The upper plate 451 is a portion forming the body of the connection duct. The body of the connection duct is divided into the upper plate 451 and a lower plate (not shown). The lower plate is not separately formed. Instead, a shape of the lower plate is formed when the base 180 on which the connection duct is positioned is fabricated through injection molding. The upper plate 451 is coupled to the shape to define a flow path through which air passes.

The injection nozzle 651 is inserted into the connection duct through a connection duct through-hole 652 to spray water onto the first heat exchanger and/or the first filtering part 350.

As illustrated in the figure, multiple injection nozzles 651 are disposed side by side on the upper plate 451 in the lateral direction of the connection duct 450. The lateral direction of the connection duct 450 is a direction perpendicular to a direction in which air flows inside the connection duct 450. When water is sequentially sprayed through the plurality of spray nozzles 651, each of the injection nozzles may clean a part of the first heat exchanger 510 and/or the first filtering part 350 in the spray area. As water is sprayed sequentially through all the injection nozzles 651, the front area of the first heat exchanger 510 and/or the first filtering part may be cleaned.

Alternatively, water may be sprayed through the nozzles simultaneously for cleaning. Also, the cleaning may be performed repeatedly.

FIG. 4-(*b*) illustrates an example in which a plurality of injection nozzles is connected to a condensed water storage part and thus indirectly connected to an external water supply source. That is, the second water supply pipe 257 is arranged between the first switching valve 255 and the water collection body 671 to connect the first switching valve 255 and the water collection body 671. Water passed through the first switching valve 255 is supplied to the water collection body 671 through the second water supply pipe 257. The supplied water is used to clean the first heat exchanger 510 or the first filtering part 350, specifically, the first filter 351 and the second filter 352, of the filter unit 300 using the injector 650.

The flow path of the injector 650 may include the water supply pump 711 to supply water stored in the water collection body 671. The water supply connection pipe 713 may be connected by the water collection body 671 and the water supply pump 711, and the injector 650 and the water supply pump 711 may be connected by the storage part water supply pipe 715.

The injector 650 may be installed on the connection duct upper plate 451 forming the upper body of the connection duct. The injector 650 may include an injection nozzle 651 configured to spray water to clean the first heat exchanger 510 or the first filtering part 350, and an injection duct 653 connecting the injection nozzle 651 to the storage part water supply pipe 715.

Due to the compact structure of the clothes treating apparatus, the size of the water collection body 671 of the condensed water storage part 670 may not be large. In this case, the capacity of the water supply pump 711 may be limited. To overcome this limitation and uniformly spray water onto the first heat exchanger or the first filtering part 350, a plurality of injection nozzles 651 may be provided. Thus, the same number of injection pipes 653 may be provided. In order to spray water while maintaining sufficient water pressure, water may not be simultaneously supplied through the injection pipes 653, but may be selectively injected into one of the injection pipes 653. That is, when a plurality of injection nozzles 651 is provided, each injection nozzle may be selected and water may be supplied through the corresponding injection duct 653. In addition, spraying may be sequentially performed.

For example, when three spray nozzles are provided, water may be sprayed by supplying water to a first spray nozzle 6511 first. Then, when a preset time elapses, water may be sprayed by supplying water to a second spray nozzle 6515. Then, when the preset time elapses again, water may be sprayed by supplying water to a third spray nozzle 6517.

For the above-described sequential spray method, the storage part water supply pipe 715 and the plurality of injection pipes 653 may not be directly connected, but may be connected via the second switching valve 655.

That is, the second switching valve 655 may be operated by the controller to switch the direction of water to supply water to each injection pipe for a predetermined time. For example, a 3-way solenoid valve may be used as the second switching valve.

The fan 470 may be arranged in the rear of the connection duct 450 or the inlet of the exhaust duct 490 to forcibly circulate air. The fan 470 may include an impeller 471 arranged in the circulation duct 400 and a blower motor 473 configured to rotate the impeller 471. The impeller 471 may be arranged in any of the exhaust duct 490, the connection duct 450, and the intake duct 410. FIG. 2 illustrates a case where the impeller 471 is provided to the exhaust duct 490 and positioned behind the second heat exchanger 520.

In summary, the present disclosure relates to a water supply part and a drainage part required for configuration of a cleaning system for cleaning the heat exchange part 500 and the filter unit 300 of a dryer located on a washer with water in a clothes treating apparatus in which the washer (second clothes treating apparatus) and a dryer (first clothes treating apparatus) are integrally configured cleaning method, and a control method for the same.

In particular, the injector 650 is used to clean the filter unit 300 and the heat exchange part 500 of the dryer with water. Water required for the cleaning is branched from the first water supply pipe of the washer using a first switching valve to supply water to the injector 650. In this case, water may be directly supplied to the injector 650 or may be supplied via the condensed water storage part 670.

After cleaning is performed through the injector 650, waste water including contaminants may be discharged to the outside by opening and closing the drain hole 672 formed in the bottom surface of the lower water collection body 671 of the dryer and sending the water to the drain pump 265 arranged in a lower portion of the washer.

Hereinafter, an example of a control method for controlling the clothes treating apparatus disclosed in the present specification will be described with reference to FIGS. 5 to 9.

Figure 5:
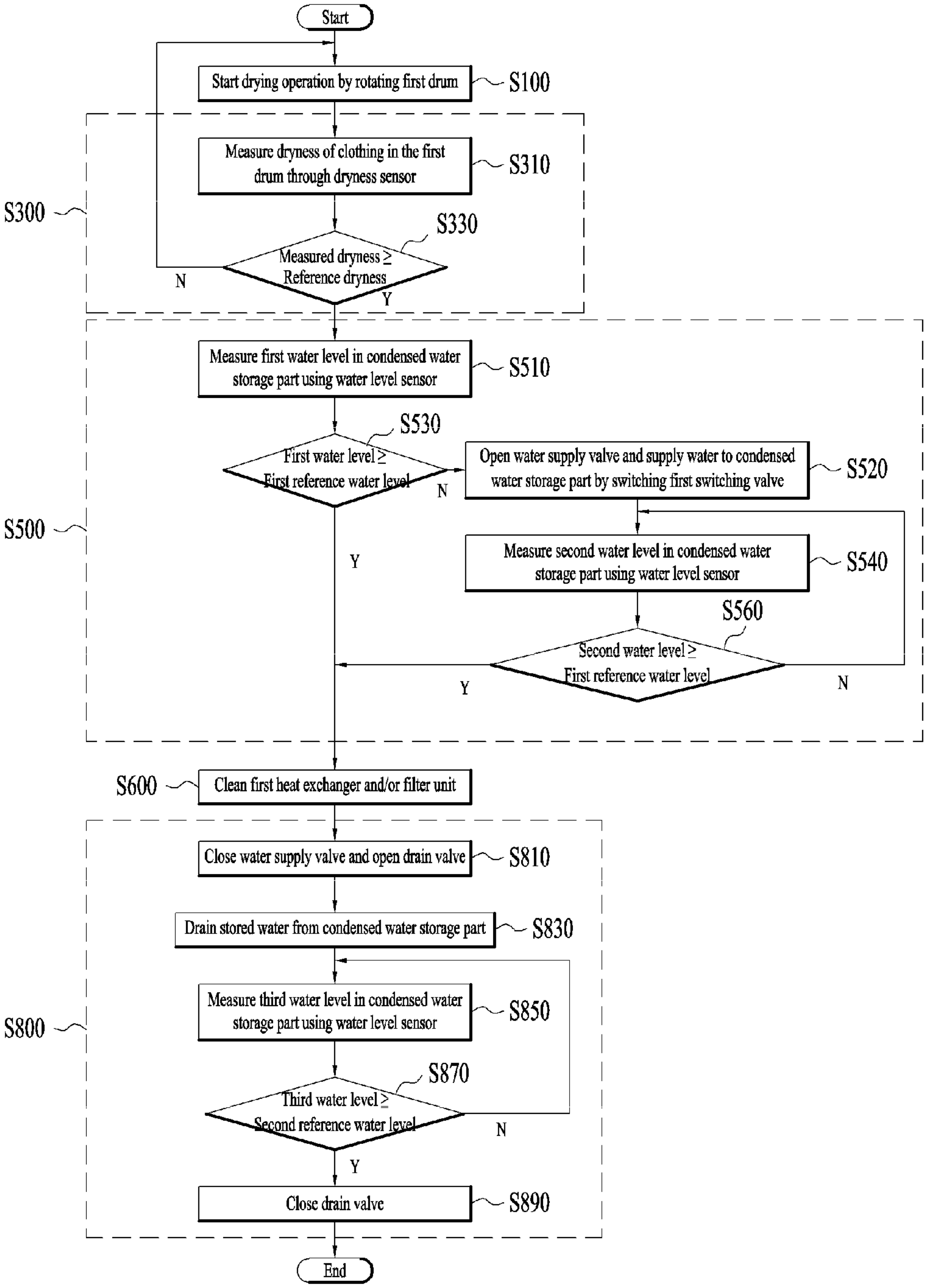
FIG. 5 illustrates a control method for supplying water replenished to a condensed water storage part through an external water supply source to an injector for cleaning.

FIG. 5 relates to a control method for cleaning the first heat exchanger 510 and/or the filter unit 300 by replenishing water in the condensed water storage part 670 through an external water supply source and supplying the water to the injector 650.

In the control method of the present disclosure, a drying operation is started by rotating the first drum 130 (S100). During the drying operation, the rotation speed of the first drum 130 may vary. During the drying operation, the air in the first drum 130 may be circulated by rotating the fan 470 alone. Alternatively, while the fan 470 rotates, the heat exchange part 500 may operate at the same time to dehumidify and heat the circulating air. That is, when the air discharged from the first drum 130 passes through the heat exchange part, the air is humid. On the other hand, when the air passed through the heat exchange part 500 is introduced into the first drum 130 through the exhaust duct 490, the air is in a relatively high temperature and dry state.

When a predetermined time elapses since the start of the drying operation of the first drum 130, the control method of the present disclosure determines the drying condition of the clothing accommodated in the first drum 130 (S300).

Dryness is measured through the dryness sensor 691 disposed inside the first drum 130 (S310). Alternatively, the dryness may be continuously measured from the beginning through the dryness sensor 691.

When the measured dryness is greater than or equal to a predetermined reference dryness (S330), the control method of the present disclosure may determine that drying has been performed to some extent and thus foreign substances are accumulated on the filter unit 300 and the first heat exchanger 510.

In particular, the filter unit 300 includes a first filtering part 350 provided in the connection duct and detachable through the filter insertion hole 313, and a second filtering part 370 provided in the intake duct. The foreign substances are mainly foreign substances accumulated by being filtered out by the first filtering part 350 and foreign substances that may be accumulated on the first heat exchange part 500.

When the dryness measured through the dryness sensor 691 is greater than or equal to a preset reference dryness, the control method of this disclosure determines whether to supplement water to the condensed water storage part 670 (S500) by measuring the water level (first water level) of water stored in the water collection body 671 of the condensed water storage part 670 through the water level sensor 693.

When the first water level is higher than or equal to a first reference water level, the control method of the present disclosure opens the water supply valve 253 and proceeds to the cleaning operation S600 using the injector 650 because it is not necessary to switch the first switching valve 255 toward the condensed water storage part 670. Thereafter, the cleaning operation described below in FIG. 8 may start as the water supply valve 253 is opened. This is because the water of the condensed water storage part 670 is reduced after spraying, and thus it is necessary to maintain the water at the first reference water level for consistent cleaning performance.

Here, the first reference water level refers to a water level for maintaining constant cleaning performance among the water levels of water stored in the water collection body 671. That is, it means a water level required to supply a predetermined amount of water by the water supply pump 711. Decrease in the water level during supply of water by the water supply pump 711 may result in a change in the amount of water supplied, which means that the cleaning performance is not constant. Thus, the first reference water level may represent an allowable water level at which cleaning performance may be maintained constant in the water collection body 671. Alternatively, it may simply mean the highest water level at which water may be stored in the water collection body 671. When the highest water level at which water may be stored is continuously maintained, the supply of water by the water supply pump 711 will be constant.

Therefore, in the present disclosure, the first reference water level may refer to a full water level reached when the water collection body 671 is full of water. However, even in this case, the reference water level may be a water level slightly lower than the full water level in consideration of an error during production.

In order to determine whether to supplement water (S500), the control method of the present disclosure measures the first water level in the water collection body 671 through the water level sensor 693 (S510). When the first water level is higher than or equal to the first reference water level (S530), the first heat exchanger 90 and/or the filter unit 300 is immediately cleaned (S600) without any action.

However, when the first water level is lower than the first reference water level (S530), an operation of replenishing water is performed because the amount of water supplied from the water supply pump 711 to the injector 650 may be changed to affect cleaning performance. That is, the controller opens the water supply valve 253 and supplies water toward the condensed water storage part 670 (S520) by switching the first switching valve 255. In addition, the controller measures the second water level in the condensed water storage part 670 using the water level sensor 693 (S540), and determines whether the second water level satisfies the first reference water level (S560). When the second water level is lower than the first reference water level, the control method of the present disclosure repeats the operation of re-measuring the second water level and the operation of comparing the measured second water level with the first reference water level.

Thereafter, in the control method of the present disclosure, an operation S600 of cleaning the first heat exchanger 510 and/or the filter unit 300 is performed. This operation is performed to prepare an operation of washing foreign substances accumulated on the filter unit 300 and the first heat exchanger 510.

That is, in the control method of the present disclosure, it is determined whether the water level in the condensed water storage part 670 satisfies the first reference water level before the cleaning operation S600 is performed. When the first reference water level is not satisfied, the first switching valve 255 is switched to replenish water from an external supply source.

When the cleaning operation S600 is completed, the control method of the present disclosure proceeds to a drainage operation S800 for draining water remaining after use. When water is sprayed through the injector 650 to remove foreign substances from the filter unit 300 and the first heat exchanger 510, water condensed by the first heat exchanger 510, water sprayed through the injector 650 or water replenished through the external water supply source may be mixed in the water collection body 671.

Accordingly, foreign substances are mixed in the water in the water collection body 671, and leaving the foreign substances unattended may cause contamination and a hygiene related issue. Therefore, water remaining after the cleaning needs to be fully discharged to the outside.

First, the controller closes the water supply valve 253 and opens the drain valve 681 (S810), and drains residual water through the drain hole 672 in the bottom surface of the water collection body 671 (S830). The discharged water is discharged toward the drain pump 265 or the first drain pipe 261 of the second clothes treating apparatus through the third drain pipe 263, and is finally discharged to the outside by the drain pump 265 through the second drain pipe.

While the residual water in the water collection body 671 is discharged, the controller measures a third water level in the condensed water storage part 670 through the water level sensor 693 (S850). This is intended to ensure that residual water has been fully drained.

Thereafter, in the control method of the present disclosure, the measured third water level is compared with the second reference water level (S870). When the third water level is higher than the second reference water level, there is residual water, and accordingly the third water level measurement (S850) and the comparison with the second reference water level (S870) are repeated until the residual water is fully drained.

When the third water level is lower than or equal to the second reference water level, it is determined that the residual water has been fully discharged from the water collection body 671, and thus the drain valve 681 is closed (S890) according to the control method of the present disclosure.

Here, the second reference water level refers to a preset water level forming a basis of determination that the water stored in the condensed water storage part 670 has been fully discharged.

Figure 6:
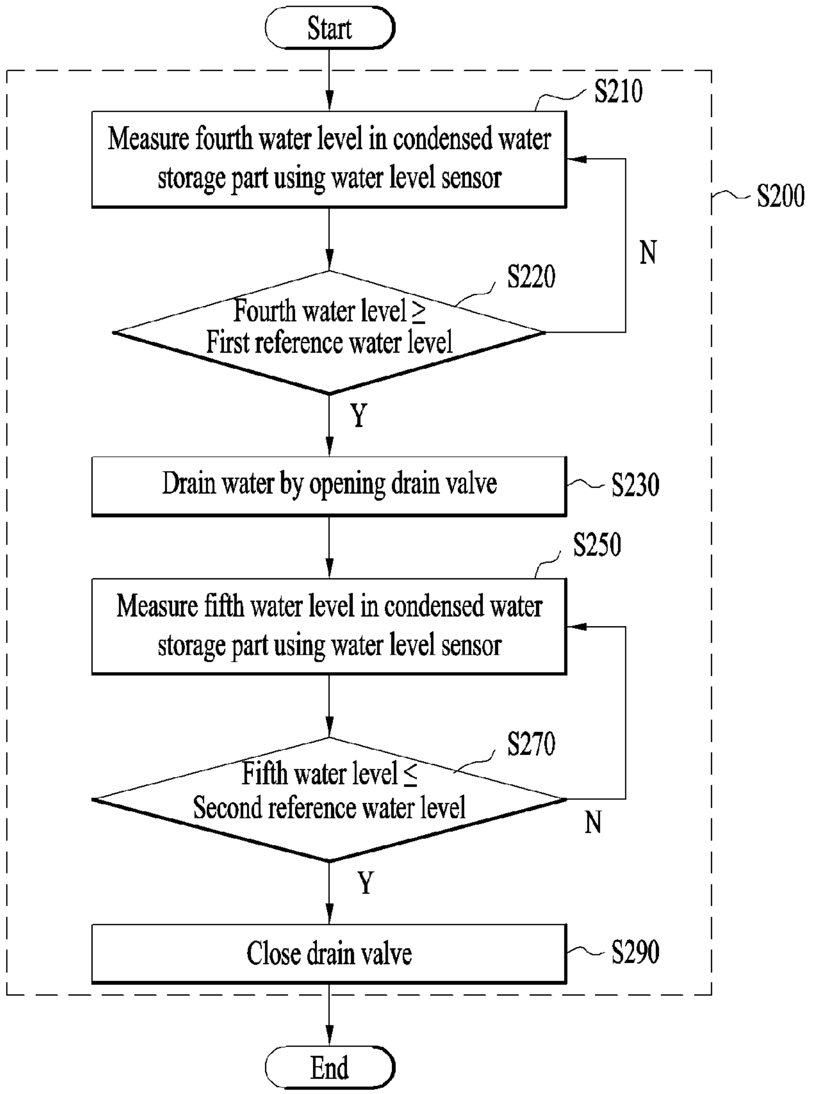
FIG. 6 illustrates an example of a drainage related control method carried out in parallel with the control method of the present disclosure.

FIG. 6 illustrates an example of a control method related to drainage of the condensed water storage part 670 which may be carried out in parallel with the control method of the present disclosure.

The storage capacity of the condensed water storage part 670, that is, the storage capacity of the water collection body 671 is smaller than the amount of water used in the cleaning operation S600. This is intended to compactly configure the inside of the second clothes treating apparatus 100. In the case where the amount of water condensed during the drying operation is larger than the storage capacity of the condensed water storage part 670, the water of the water collection body 671 may flow back to the connection duct 450 when the water level of the water collection body 671 exceeds the first reference water level. In addition, when the drainage is blocked or the water pressure is strong and thus the amount of supplied water is larger than that of drained water during cleaning of the filter unit and/or the first heat exchanger through the injector 650, the water level in the condensed water storage part 670 may rise, resulting in backflow.

In order to prevent this issue, the water level needs to be checked during the drying operation S100, the water replenishment S500, or the cleaning S600, and the drainage S200 needs to be performed when the measured water level is higher than the first reference water level. To this end, operations from the drying operation S100 to an operation before the drainage operation S800 may be continuously performed in parallel.

First, when the drying operation is started, the water level (fourth water level) in the condensed water storage part may be measured using the water level sensor 693 (S210) according to the control method of the present disclosure. When the fourth water level is lower than the first reference water level, drainage is not required, and thus the fourth water level is re-measured.

When the fourth water level is higher than or equal to the first reference water level, drainage is required, and thus residual water is drained through the drain hole 672 in the bottom surface of the water collection body 671 (S230) by opening the drain valve 681 (S230) according to the control method of the present disclosure. The discharged water is discharged toward the drain pump 265 or the first drain pipe 261 of the second clothes treating apparatus through the third drain pipe 263, and is finally discharged to the outside by the drain pump 265 through the second drain pipe 262.

While the residual water in the water collection body 671 is discharged, a fifth water level in the condensed water storage part 670 is measured through the water level sensor 693 according to the control method of the present disclosure. This is intended to ensure that residual water has been fully drained. Thereafter, the measured fifth water level is compared with the second reference water level (S270) according to the control method of the present disclosure. When the fifth water level is higher than the second reference water level, there is residual water, and accordingly the fifth water level measurement (S250) and the comparison with the second reference water level (S270) are repeated until the residual water is fully drained.

When the fifth water level is lower than or equal to the second reference water level (S270), it is determined that the residual water is fully discharged from the water collection body 671, and thus the drain valve 681 is closed (S290) according to the control method of the present disclosure.

Figure 7:
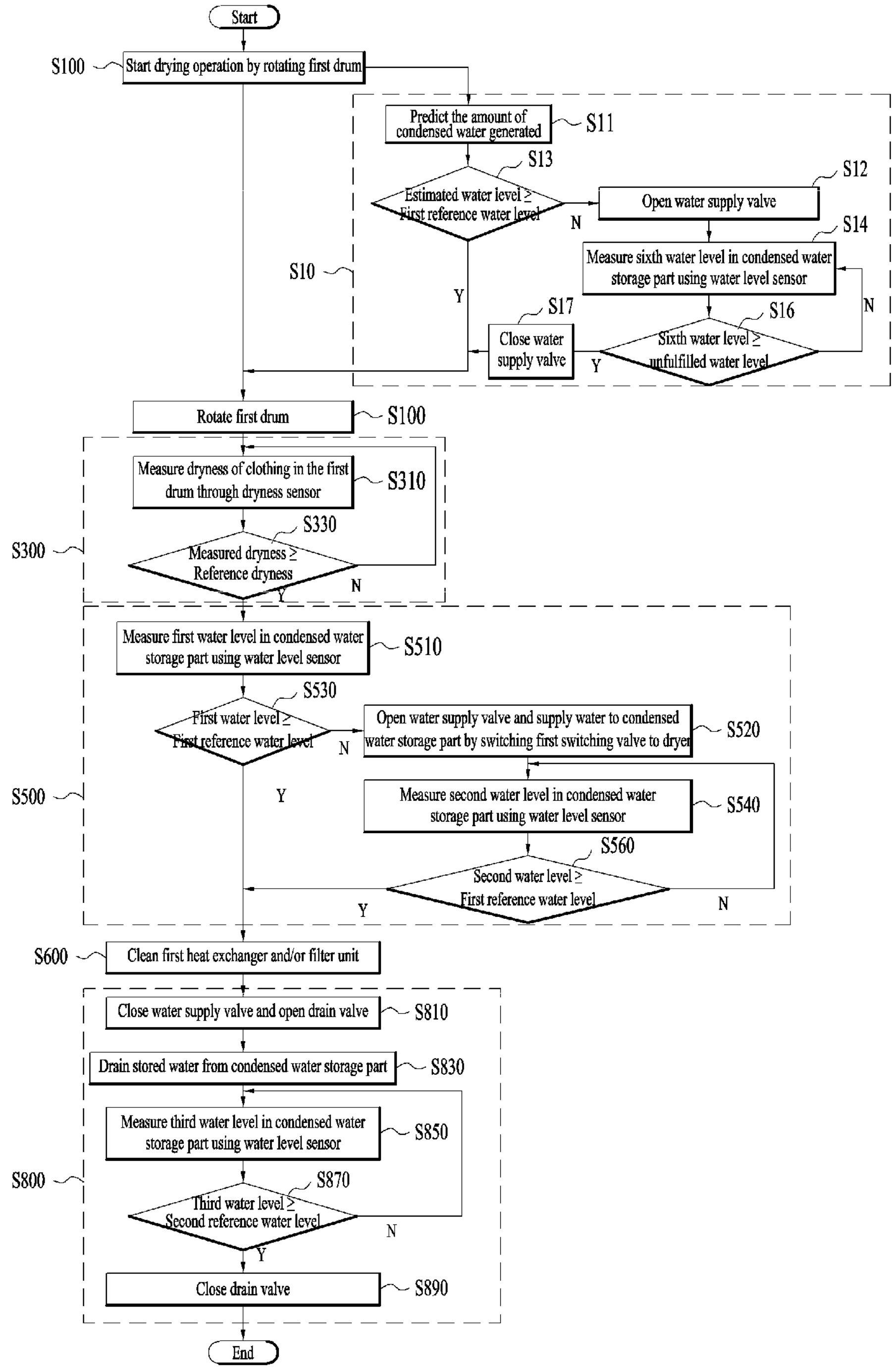
FIG. 7 illustrates an example of the control method of the present disclosure to which an operation of predicting the amount of generated condensed water is added with the condensed water storage part connected to an external water supply source.

FIG. 7 illustrates an example of the control method of the present disclosure to which an operation of predicting the amount of generated condensed water and replenishing a required amount (S10) is added with the condensed water storage part connected to an external water supply source.

When the user selects the drying operation, the amount of condensed water generated may be predicted while rotating the first drum 130 to start the drying operation S100 according to the control method of the present disclosure (S11). When it is determined through the dryness sensor 691 that the reference dryness is satisfied, the water level in the condensed water storage part 670 is measured through the water level sensor 693. Then, when water needs to be replenished up to the first reference water level, a corresponding time delay may occur.

Accordingly, when the amount of water required for the condensed water storage part 670 is pre-replenished, the cleaning operation may be immediately performed once the reference dryness is satisfied.

To this end, in the control method of the present disclosure, when the drying operation is started, a laundry amount is sensed to predict the amount of condensed water generated (S11). The clothes treating apparatus 100 may further include a laundry amount sensor configured to determine an amount of clothing stored in the first drum body 131. The laundry amount sensor may be provided as a means to transmit the amount of electric current supplied to the first motor 141 of a first driving unit to rotate the first drum body 131 at a predetermined rotation speed, or as a means to transmit, to the controller, the rotation speed of the first drum body 131 obtained when current having a predetermined magnitude is supplied for a predetermined time. When the laundry amount sensor is provided, the controller may predict the amount of condensed water generated from the clothing accommodated in the first drum by sensing the laundry amount.

Once the amount of condensed water generated is predicted through the laundry amount sensor, the estimated water level in the condensed water body 671 is compared with the first reference water level (S13) according to the control method of the present disclosure. When the estimated water level is higher than or equal to the first reference water level, the drying operation is performed without replenishing water.

When the estimated water level is below the first reference water level, water needs to be replenished, and accordingly the water supply valve 253 is opened (S12) during the drying operation according to the control method of the present disclosure to replenish required water. The amount of required water corresponds to the water level obtained by subtracting the estimated water level from the first reference water level. Therefore, when the water level corresponding to the amount corresponding to the water level obtained by subtracting the estimated water level from the first reference water level is an unfulfilled water level, the control method of the present disclosure may measure a water level (a sixth water level) in the condensed water storage part 670 through the water level sensor 693 (S14) and compare the same with the unfulfilled water level (S13) to determine whether to stop the water supply. That is, when water is replenished by the unfulfilled water level, the water supply valve may be closed (S17). Subsequent operations are the same as those in the control method described with reference to FIG. 5.

Figure 8:
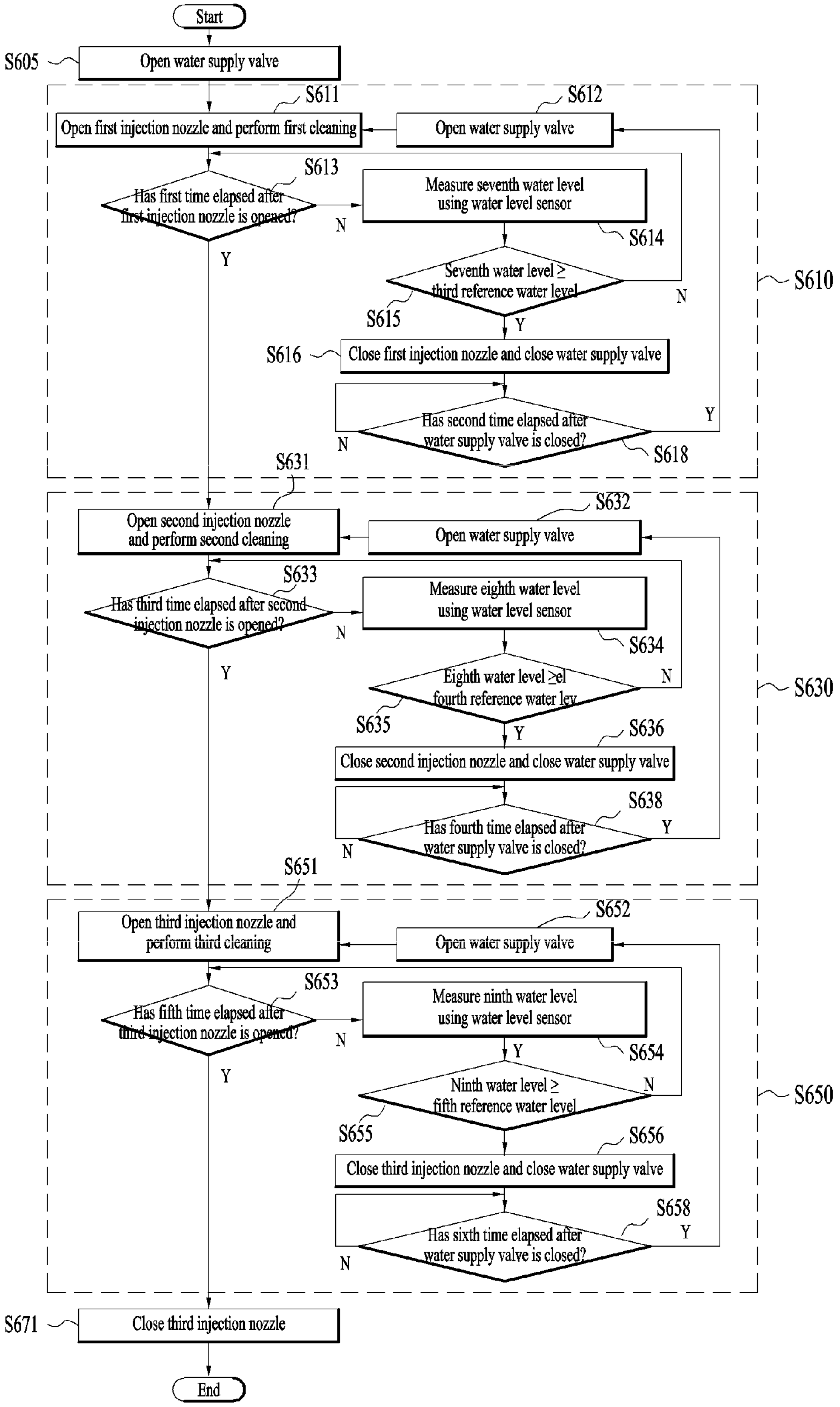
FIG. 8 illustrates an example of a specific control method for cleaning a heat exchanger when three injection nozzles are provided.

FIG. 8 relates to a control method for cleaning the filter unit 300 and/or the first heat exchanger 510 through the injector 650 in the cleaning operation S800. In particular, the injector 650 may include one injection nozzle 651 and one injection duct 653, and thus water may be supplied directly to the one injection duct 653 through the water supply pump connection pipe 713, the water supply pump 711, and the storage part water supply pipe 715. In general, however, a plurality of injection nozzles and injection pipes may be provided. That is, the injector may include a plurality of injection nozzles 651 and the same number of injection pipes 653 corresponding thereto, and the second switching valve 655. Each of the injection nozzles 651 may be sequentially connected according to the switching of the second switching valve to spray water. This is because the installation space inside the first clothes treating apparatus 100 is not large, and thus the capacity of the water supply pump 711 may be limited.

When the storage part water supply pipe 715 is sequentially connected to one of the injection nozzles by the second switching valve 655, each of the injection nozzles may spray water to a different area of the filter unit 300 and/or the first heat exchanger 510. In general, the injection nozzles may be disposed side by side on the connection duct in the lateral direction to spray water onto different areas. Alternatively, the injection nozzles may be disposed longitudinally or or in a V-shape to to spray water onto different areas. FIG. 8 illustrates an example of a control method in a case where three injection nozzles are arranged side by side in the lateral direction to spray water.

First, the water supply valve 253 is opened (S605) before the cleaning is performed. When the first water level is higher than or equal to the first reference water level, the water supply valve 253 that has never been opened is opened to allow water to be continuously replenished as much as the water to sprayed and discharged forward. When water is replenished as the first water level is lower than the first reference water level in the previous operation, the water supply valve 253 does not need to be opened again because the water supply valve 253 has been opened for water replenishment.

First, in the control method of the present disclosure, the second switching valve 655 is switched to be connected to the first injection nozzle 6511 through the first injection duct 653. Accordingly, the first injection nozzle 6511 is opened to perform a first cleaning operation S611. The first cleaning operation S611 is continued for a preset first time (S613).

When the first time has not elapsed, a seventh water level is measured through the water level sensor 693 (S614) according to the control method of the present disclosure. This operation is intended to prevent backflow from occurring due to rise of the water level when the water supply rate is greater than the water spray rate according to a high water pressure or when drainage is not smooth due to clogging of the drainage part. When the seventh water level is higher than or equal to the preset third reference water level (S615), the first injection nozzle 6511 and the water supply valve 253 are closed by switching the second switching valve 655 (S616) according to the control method of the present disclosure. When a preset second time elapses after the water supply valve 253 is closed, the water supply valve 253 is opened (S612). Thereafter, the control method of the present disclosure proceeds again from the first cleaning S611.

The first time may be set to 10 seconds, and the second time may be set to 5 seconds.

The third reference water level may be a level set to prevent backflow and may be the same as the first reference water level. Alternatively, it may be set differently.

When the first injection operation S610 is completed, the control method of the present disclosure sequentially proceeds to the second injection operation S630 and the third injection operation S650. In addition, when it is determined that the contamination level is high in a specific area of the first heat exchange part 500 or the filter unit 300, only the area with the high contamination level may be cleaned by spraying water. In this case, after determining an area with a high contamination level through a contamination level sensor, the control method of the present disclosure may select and proceed to one of the first injection operation S610, the second injection operation S630, and the third S650.

According to the control method of the present disclosure, when the first injection operation S610 is completed, the second switching valve 655 is switched to connect the second injection nozzle 6512 through the second injection duct 653. Accordingly, the second injection nozzle 6512 is opened, and the first injection nozzle 6511 opened in the first injection operation S610 is closed.

As a result, in the control method of the present disclosure, as the second injection nozzle 6512 is opened, a second cleaning operation S631 is performed. The second cleaning operation S631 is continued for a preset third time (S633).

When the third time has not elapsed, an eighth water level is measured through the water level sensor 693 (S634) according to the control method of the present disclosure. This operation is intended to prevent backflow from occurring in the water collection body 671 due to rise of the water level when the water supply rate is greater than the water spray rate according to a high water pressure or when drainage is not smooth due to clogging of the drainage part 260. When the eighth water level is higher than or equal to the preset fourth reference water level (S635), the second injection nozzle 6512 and the water supply valve 253 are closed by switching the second switching valve 655 (S636) according to the control method of the present disclosure. When a preset fourth time elapses after the water supply valve 253 is closed, the water supply valve 253 is opened (S632). Thereafter, the control method of the present disclosure proceeds again from the second cleaning S631.

The third time may be set to 10 seconds, and the fourth time may be set to 5 seconds. The fourth reference water level may be a level set to prevent backflow and may be the same as the first reference water level. Alternatively, it may be set differently.

When the second injection operation S630 is completed, the control method of the present disclosure may proceed to the third injection operation S650. That is, according to the control method of the present disclosure, the second switching valve 655 is switched to connect to the third injection nozzle 6513 through the third injection duct 653. Accordingly, the third injection nozzle 6513 is opened, and the second injection nozzle 6512 opened in the second injection operation S610 is closed.

As a result, in the control method of the present disclosure, as the third spray nozzle 6513 is opened, a third cleaning operation S651 is performed. The third cleaning operation S651 is continued for a preset fifth time (S653).

When the fifth time has not elapsed, a ninth water level is measured through the water level sensor 693 (S654) according to the control method of the present disclosure. This operation is intended to prevent backflow from occurring in the water collection body 671 due to rise of the water level when the water supply rate is greater than the water spray rate according to a high water pressure or when drainage is not smooth due to clogging of the drainage part 260. When the ninth water level is higher than or equal to the preset fifth reference water level (S655), the third injection nozzle 6513 and the water supply valve 253 are closed by switching the second switching valve 655 (S656) according to the control method of the present disclosure. According to the control method of the present disclosure, when a preset sixth time elapses after the water supply valve 253 is closed, the water supply valve 253 is opened (S652) to proceed again from the third cleaning S651.

The fifth time may be set to 10 seconds, and the sixth time may be set to 5 seconds. The fifth reference water level may be a level set to prevent backflow and may be the same as the first reference water level. Alternatively, it may be set differently.

Figure 9:
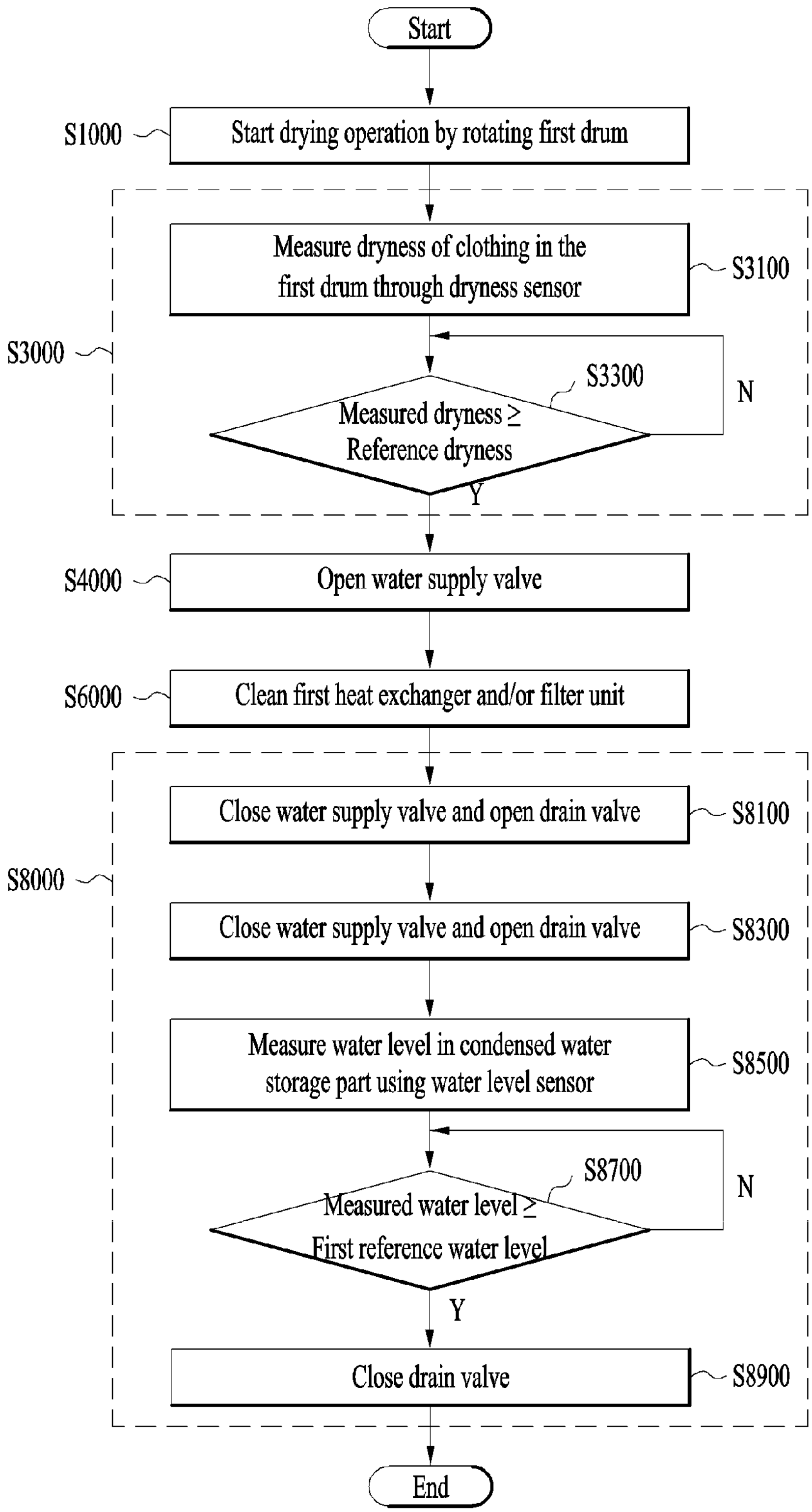
FIG. 9 illustrates an example of the control method of the present disclosure when an injection nozzle is directly connected to an external water supply source.

FIG. 9 illustrates an example of the control method of the present disclosure when an injection nozzle is directly connected to an external water supply source.

First, the drying operation is started by rotating the first drum 130 (S1000). Thereafter, according to the control method of the present disclosure, it is determined whether the dryness measured by the dryness sensor 691 is greater than or equal to a preset reference dryness (S3000). According to the control method of the present disclosure, when a predetermined time elapses after the drying operation of the first drum 130 starts, the drying condition of the clothing accommodated in the first drum 130 may be determined (S300). Alternatively, the control method of the present disclosure may continuously measure the dryness through the dryness sensor 691 from the beginning.

In contrast with the example of FIG. 5, the injector 650 may be directly connected to an external water supply source without using the condensed water storage part 670. Accordingly, the operation of determining whether to replenish water at a reference dryness or more is omitted. That is, in the control method of this disclosure, when the measured dryness is greater than or equal to the preset reference dryness, the water supply valve may be opened to directly supply water to the injector 650. The control method of the present disclosure proceeds to the cleaning operation S6000 by the control method as illustrated in FIG. 8. Of course, this is merely an example, and the cleaning may be performed differently.

When the cleaning operation S6000 is completed, the control method of the present disclosure proceeds to a drainage operation S8000 for draining water remaining after use. When water is sprayed through the injector 650 to remove foreign substances from the filter unit 300 and the first heat exchanger 510, water condensed by the first heat exchanger 510, water sprayed through the injector 650 or water replenished through the external water supply source may be mixed in the water collection body 671.

Accordingly, foreign substances are mixed in the water in the water collection body 671, and leaving the foreign substances unattended may cause contamination and a hygiene related issue. Therefore, water remaining after the cleaning needs to be fully discharged to the outside.

First, the controller closes the water supply valve 253 and opens the drain valve 681 (S8100), and drains residual water through the drain hole 672 in the bottom surface of the water collection body 671 (S8300). The discharged water is discharged toward the drain pump 265 or the first drain pipe 261 of the second clothes treating apparatus through the third drain pipe 263, and is finally discharged to the outside by the drain pump 265 through the second drain pipe.

While the residual water in the water collection body 671 is discharged, a water level in the condensed water storage part 670 is measured through the water level sensor 693 (S8500) according to the control method of the present disclosure. This is intended to ensure that residual water has been fully drained.

Thereafter, in the control method of the present disclosure, the measured water level is compared with a drainage reference water level (S8700). When the measured water level is higher than the drainage reference water level, there is residual water, and accordingly the water level measurement (S8500) and the comparison with the drainage reference water level (S870) are repeated until the residual water is fully drained.

When the measured level is lower than or equal to the drainage reference water level, it is determined that the residual water has been fully discharged from the water collection body 671, and thus the drain valve 681 is closed according to the control method of the present disclosure.

Here, the drainage reference water level refers to a preset water level forming a basis of determination that the water stored in the condensed water storage part 670 has been fully discharged.

The present disclosure may be modified and implemented in various forms, but the scope of the present disclosure is not limited to the above-described embodiments. Therefore, a modified embodiment including the elements of the claims of the present disclosure should be regarded as belonging to the scope of the present disclosure.

The invention claimed is:

1. A clothes treating apparatus comprising:

a first cabinet that defines at least a portion of an outer appearance of the clothes treating apparatus;

a first drum rotatably disposed in the first cabinet and configured to accommodate clothes;

a circulation duct configured to guide air discharged from the first drum;

a heat exchange part disposed inside the circulation duct, the heat exchange part comprising a first heat exchanger and a second heat exchanger that are configured to perform heat exchange with the air in the circulation duct;

a filter disposed inside the circulation duct and configured to separate foreign substances from the air in the circulation duct prior to the heat exchange;

a second cabinet disposed below the first cabinet;
a tub disposed inside the second cabinet and configured to receive water;
a second drum rotatably disposed inside the tub and configured to accommodate clothes;
a condensed water storage configured to store at least one of condensed water that is condensed through the heat exchange by the first heat exchanger, water that is supplied from an external water supply source, or water that is sprayed to the first heat exchanger or the filter;
a water supply connected to the external water supply source and configured to supply water to the tub or the condensed water storage;
an injector configured to spray the water from the condensed water storage to the first heat exchanger or the filter; and
a drainage arranged to discharge water from the tub or the condensed water storage to an outside of the clothes treating apparatus,
wherein the drainage comprises:
a drain pump configured to cause the water to be discharged from the tub to the outside,
a first drain pipe that connects the tub to the drain pump,
a second drain pipe configured to drain the water from the drain pump to the outside,
a third drain pipe that connects the condensed water storage to the first drain pipe or the drain pump, and
a drain valve configured to open and close the third drain pipe, and
wherein the condensed water storage is configured to fluidly communicate with the drainage and to discharge stored condensed water to the drainage.

2. The clothes treating apparatus of claim 1, wherein the first cabinet and the second cabinet are parts of a single cabinet.

3. The clothes treating apparatus of claim 1, further comprising:
a dryness sensor disposed at the first drum and configured to measure a dryness of the clothes in the first drum.

4. The clothes treating apparatus of claim 3, wherein the condensed water storage comprises:
a water level sensor configured to measure a water level of the water in the condensed water storage.

5. The clothes treating apparatus of claim 4, wherein the water supply comprises:
a first water supply pipe connected to the external water supply source;
a water supply valve configured to open and close the first water supply pipe;
a first switching valve configured to selectively supply water passing through the water supply valve to the tub or the condensed water storage; and
a second water supply pipe that connects the first switching valve to the condensed water storage.

6. The clothes treating apparatus of claim 1, wherein the injector comprises:
one or more injection nozzles configured to spray the water from the condensed water storage to the first heat exchanger or the filter;
a second switching valve configured to selectively supply the water from the condensed water storage to the one or more injection nozzles;
one or more injection ducts that connect the second switching valve to the one or more injection nozzles, a number of the one or more injection ducts being equal to a number of the one or more injection nozzles; and
a storage water supply pipe configured to supply the water stored in the condensed water storage to the second switching valve.

7. The clothes treating apparatus of claim 6, wherein the circulation duct comprises:
an intake duct configured to receive the air discharged from the first drum;
an exhaust duct configured to discharge the air having passed through the heat exchange part to the first drum; and
a connection duct that connects the intake duct to the exhaust duct and accommodates the heat exchange part therein.

8. The clothes treating apparatus of claim 7, wherein the connection duct comprises an upper plate that defines a circulation flow path of the connection duct, and
wherein the one or more injection nozzles are fixed to the upper plate of the connection duct and configured to spray the water from the condensed water storage to a plurality of areas of the first heat exchanger or the filter.

9. The clothes treating apparatus of claim 8, wherein the one or more injection nozzles are arranged on the upper plate in a lateral direction of the first cabinet, and
wherein the second switching valve is configured to connect the storage water supply pipe sequentially to the one or more injection nozzles to thereby spray the water from the condensed water storage to the plurality of areas of the first heat exchanger or the filter.

10. A clothes treating apparatus comprising:
a first cabinet that defines at least a portion of an outer appearance of the clothes treating apparatus;
a first drum rotatably disposed in the first cabinet and configured to accommodate clothes;
a circulation duct configured to guide air discharged from the first drum;
a heat exchange part disposed inside the circulation duct, the heat exchange part comprising a first heat exchanger and a second heat exchanger that are configured to perform heat exchange with the air in the circulation duct;
a filter disposed inside the circulation duct and configured to separate foreign substances from the air in the circulation duct prior to the heat exchange;
a second cabinet disposed below the first cabinet;
a tub disposed inside the second cabinet and configured to receive water;
a second drum rotatably disposed inside the tub and configured to accommodate clothes;
an injector configured to spray water to the first heat exchanger or the filter;
a water supply connected to an external water supply source and configured to supply water to the tub or the injector;
a condensed water storage configured to store condensed water condensed through the heat exchange by the first heat exchanger and configured to store water sprayed through the injector; and
a drainage configured to discharge water from the tub and the condensed water storage to an outside of the clothes treating apparatus,
wherein the drainage comprises:
a drain pump configured to cause the water to be discharged from the tub to the outside,
a first drain pipe that connects the tub to the drain pump,
a second drain pipe configured to drain the water from the drain pump to the outside, a third drain pipe that connects the condensed water storage to the first drain pipe or the drain pump, and a drain valve configured to open and close the third drain pipe, and wherein the condensed water storage is configured to fluidly communicate with the drainage and to discharge the stored condensed water to the drainage.

11. The clothes treating apparatus of claim 10, wherein the water supply comprises:

a branch pipe configured to branch the water from the external water supply source to the tub and the injector; and an injector water supply pipe that connects the branch pipe to the injector.

12. The clothes treating apparatus of claim 11, wherein the injector comprises:

one or more injection nozzles configured to spray the water from the condensed water storage to the first heat exchanger or the filter; and a switching valve connected to the injector water supply pipe and configured to selectively supply the water from the condensed water storage to the one or more injection nozzles.

13. The clothes treating apparatus of claim 10, wherein the filter comprises:

a first filtering part configured to filter a fluid moving to the first heat exchanger; and a second filtering part spaced apart from the first filtering part and configured to filter the fluid moving to the first filtering part.

14. The clothes treating apparatus of claim 13, wherein the injector is configured to spray the water from the condensed water storage toward the first heat exchanger or the first filtering part.

15. A method for controlling a clothes treating apparatus, the clothes treating apparatus including a first cabinet that defines at least a portion of an outer appearance of the clothes treating apparatus, a first drum rotatably disposed in the first cabinet and configured to accommodate clothes, a circulation duct configured to guide air discharged from the first drum, a heat exchange part that is disposed inside the circulation duct and includes a first heat exchanger and a second heat exchanger that are configured to perform heat exchange with the air in the circulation duct, a filter arranged inside the circulation duct and configured to separate foreign substances from the air in the circulation duct prior to the heat exchange, a second cabinet disposed below the first cabinet, a tub disposed inside the second cabinet and configured to receive water, a second drum rotatably disposed inside the tub and configured to accommodate clothes, a condensed water storage configured to store at least one of condensed water that is condensed through the heat exchange by the first heat exchanger, water that is supplied from an external water supply source, or water that is sprayed to the first heat exchanger or the filter, a water supply valve connected to the external water supply source and configured to supply water to the tub or the condensed water storage, an injector configured to spray the water from the condensed water storage to the first heat exchanger or the filter, a dryness sensor disposed at the first drum and configured to measure a dryness of the clothes in the first drum, a water level sensor configured to measure a water level in the condensed water storage, and a drainage including a drain pump configured to cause the water to be discharged from the tub to the outside, a first drain pipe that connects the tub to the drain pump, a second drain pipe configured to drain the water from the drain pump to the outside, a third drain pipe that connects the condensed water storage to the first drain pipe or the drain pump, and a drain valve configured to open and close the third drain pipe, wherein the condensed water storage is configured to fluidly communicate with the drainage and to discharge stored condensed water to the drainage, the method comprising:

performing a drying operation that includes rotating the first drum;

comparing the dryness measured by the dryness sensor to a reference dryness;

based on the measured dryness being greater than or equal to the reference dryness, measuring the water level through the water level sensor;

based on the water level being lower than a first reference water level, supplying water to the condensed water storage by opening the water supply valve until the water level measured by the water level sensor becomes higher than or equal to the first reference water level; and cleaning the first heat exchanger or the filter by spraying water through the injector.

16. The method of claim 15, further comprising:

after cleaning the first heat exchanger or the filter by spraying the water through the injector, closing the water supply valve and draining residual water from the condensed water storage through the drainage.

17. The method of claim 15, further comprising:

sensing a laundry amount of the clothes accommodated in the first drum by a laundry amount sensor;

before starting the drying operation, predicting an amount of condensed water to be generated based on the sensed laundry amount of the clothes accommodated in the first drum;

based on the predicted amount of condensed water, determining an amount of water to be supplied to the condensed water storage, the amount of water being less than a reference water level of the condensed water storage; and supplying the determined amount of water to the condensed water storage by opening the water supply valve.

18. A method for controlling a clothes treating apparatus, the clothes treating apparatus including a first cabinet that defines at least a portion of an outer appearance of the clothes treating apparatus, a first drum rotatably disposed in the first cabinet and configured to accommodate clothes, a circulation duct configured to guide air discharged from the first drum, a heat exchange part that is disposed inside the circulation duct and includes a first heat exchanger and a second heat exchanger that are configured to perform heat exchange with the air in the circulation duct, a second cabinet disposed below the first cabinet, a tub disposed inside the second cabinet and configured to receive water, a second drum rotatably disposed inside the tub and configured to accommodate clothes, an injector configured to spray water to the first heat exchanger, a water supply pipe connected to an external water source and configured to supply water to the clothes treating apparatus, a water supply valve configured to open and close the water supply pipe, a condensed water storage configured to store at least one of condensed water that is condensed through the heat exchange by the first heat exchanger, water that is supplied through the water supply pipe, or water that is sprayed to the first heat exchanger through the injector, a dryness sensor disposed at the first drum and configured to measure a dryness of the clothes in the first drum, a water level sensor configured to measure a water level in the condensed water storage, and a drainage configured to discharge water from the tub and the condensed water storage to an outside of the clothes treating apparatus, the drainage including a drain pump configured to cause the water to be discharged from the tub to the outside, a first drain pipe that connects the tub to the drain pump, a second drain pipe configured to drain the water from the drain pump to the outside, a third drain pipe that connects the condensed water storage to the first drain pipe or the drain pump, and a drain valve configured to open and close the third drain pipe, wherein the condensed water storage is configured to fluidly communicate with the drainage and to discharge the stored condensed water to the drainage, the method comprising:

performing a drying operation that includes rotating the first drum;

measuring the dryness of the clothes in the first drum by the dryness sensor;

based on the dryness measured by the dryness sensor being greater than or equal to a reference dryness, measuring a first water level through the water level sensor;

based on the measured dryness being greater than or equal to the reference dryness, supplying the water in the condensed water storage to the injector by opening the water supply valve; and cleaning the first heat exchanger by spraying the water from the condense water storage through the injector.

* * * * *